(12) United States Patent
Tanaka

(10) Patent No.: US 8,368,926 B2
(45) Date of Patent: Feb. 5, 2013

(54) REUSE OF DOCUMENT PRINT ATTRIBUTES

(75) Inventor: Satoshi Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1024 days.

(21) Appl. No.: 12/388,165

(22) Filed: Feb. 18, 2009

(65) Prior Publication Data

US 2009/0219555 A1    Sep. 3, 2009

(30) Foreign Application Priority Data

Feb. 28, 2008    (JP) ................. 2008-048533

(51) Int. Cl.
*G06F 3/12* (2006.01)
*G06F 3/00* (2006.01)
*H04N 1/00* (2006.01)

(52) U.S. Cl. ........ 358/1.15; 358/1.9; 358/403; 358/442; 715/713; 715/234

(58) Field of Classification Search .................. None
See application file for complete search history.

(56) References Cited

U.S. PATENT DOCUMENTS

2008/0024802 A1* 1/2008 Kato .............. 358/1.9

FOREIGN PATENT DOCUMENTS

| JP | 2004-110638 A | 4/2004 |
| JP | 2004-192248 A | 7/2004 |
| JP | 2005-250606 A | 9/2005 |

OTHER PUBLICATIONS

"XML Paper Specification: Overview." Microsoft Corporation. 2009. <http://www.microsoft.com/whdc/XPS/default.Mspx>.
"PrintTicket and PrintCapabilities Support in Windows Print Drivers." Microsoft Windows. Feb. 6, 2006. <http://www.microsoft.com/whdc/device/print/XPSDrv_PrintTicket.mspx>.

* cited by examiner

*Primary Examiner* — Thomas Lett
(74) *Attorney, Agent, or Firm* — Canon USA, Inc., IP Division

(57) ABSTRACT

An information processing apparatus includes a storing unit configured to store, in a storage device, print setting information including a hierarchical structure of a document and a print attribute associated with a hierarchical level of the document, and a setting unit configured to, when the print attribute in the print setting information stored in the storage device is applied to a selected document, compare a hierarchical structure of the selected document and the hierarchical structure of the print setting information and to set a print attribute to an appropriate hierarchical level of the selected document based on a comparison result and the print attribute of the print setting information.

12 Claims, 24 Drawing Sheets

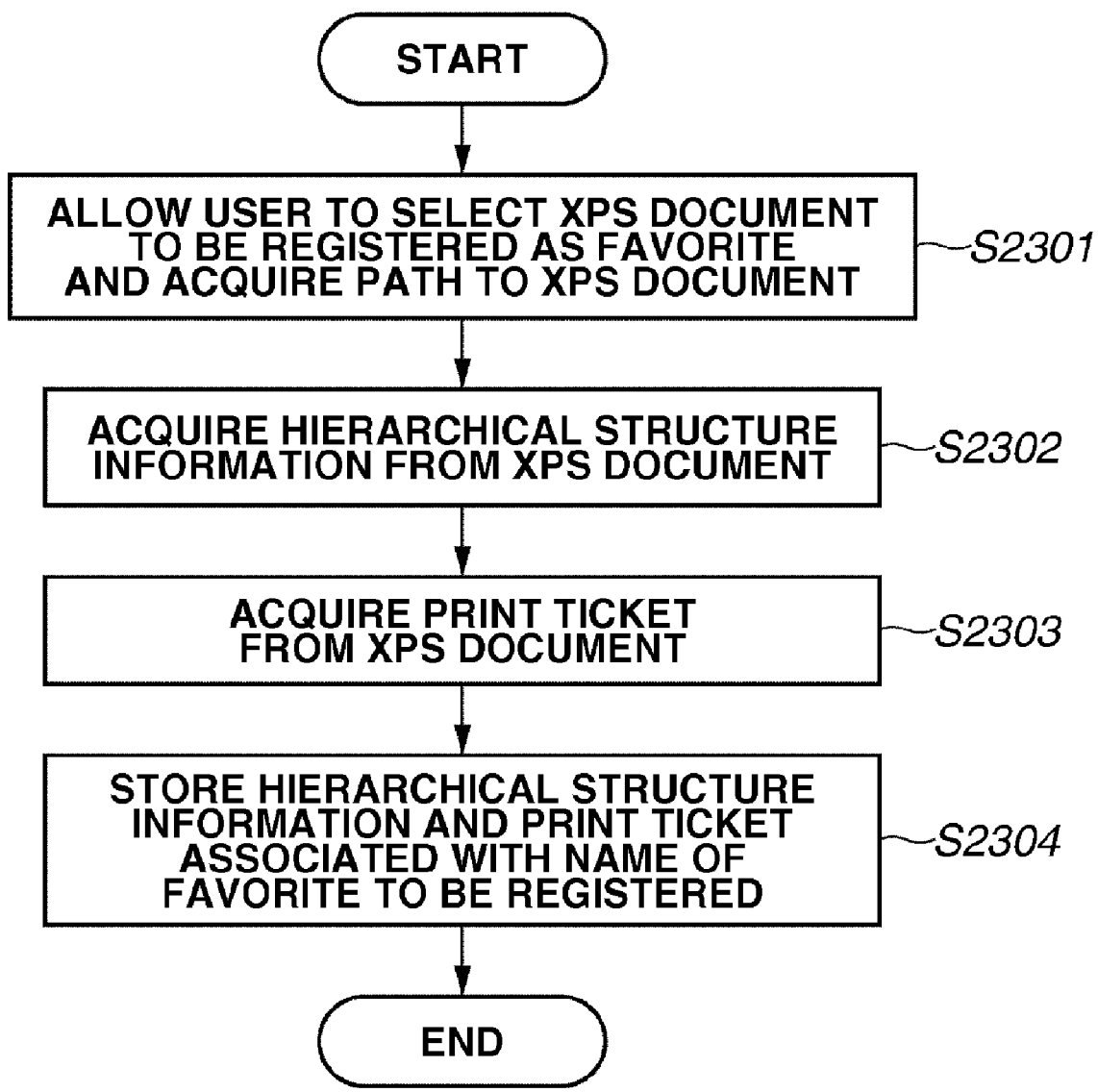

REUSE OF DOCUMENT PRINT ATTRIBUTES

BACKGROUND OF THE INVENTION

1. Field of the Invention

The present invention relates to an information processing apparatus, an information processing method, and a computer-readable storage medium.

2. Description of the Related Art

Microsoft has announced a plan to support an extended markup language (XML) paper specification (XPS) which is a new XML-based document format by Windows Vista® ("XML Paper Specification: Overview" [search results as of Feb. 15, 2008], <URL: http://www.microsoft.com/whdc/xps/default.mspx>). An XPS document has a document format including three hierarchical levels called FixedDocumentSequence, FixedDocument, and FixedPage. XML documents containing print attributes referred to as print tickets, can be associated with nodes of each hierarchical level. ("Print Ticket and Print Capabilities Support in Windows Printer Drivers", [search results as of Feb. 15, 2008], <URL: http://www.microsoft.com/whdc/device/print/XPSDrv_PrintTicket.mspx(XPSDrv_PrintTicket.doc)>). A job-level print ticket is associated with FixedDocumentSequence. Further, a document-level print ticket is associated with FixedDocument1. Further, a page-level print ticket is associated with FixedPage1.

Since the print ticket can be specified for each node of each hierarchical level, an XPS document can change, for example, an output size for each FixedPage, or stapling setting for each FixedDocument. As mentioned in "XML Paper Specification: Overview", the XPS document has an aspect of a print spooler format used during printing, and another aspect of an ordinary document. Regarding the document aspect, the XPS document can be used as a document format for publishing and distributing various documents, in the same manner as a page description format (PDF) file. As described above, the XPS document can retain a print ticket for each node of the hierarchical levels, and as a result, it is possible to create and distribute XPS documents associated with print attributes.

Further, the XPS document includes an exception setting function which allows a user to specify different print attribute settings for each page in addition to print attribute settings for an entire job. For example, in a case where a user creates a document including a plurality of sections, the user may desire to use colored paper for first pages of the sections and white paper for the rest of the pages. In such a case, the user makes a setting to use white paper for the entire job and use colored paper only for the first page of each section, that is different from the print attribute settings for the entire job. Specifying the different print attribute settings is not limited to a paper type (color) to be used. There are cases in which a user may desire other kinds of setting, for example, a paper size, one-sided/two-sided printing, finishing, and color settings, for a specific page or a range of pages to be different from the print attribute settings of the entire job. (Refer to Japanese Patent Application Laid-Open No. 2004-110638 and Japanese Patent Application Laid-Open No. 2005-250606).

When different print attribute settings are set for each page in a printer driver or an application, following procedures are often used.

1. A tab sheet or a dialog used to set page exceptions is opened to specify a page or a page range and create a partition,
2. Print attributes are specified for the partition in a lower-level dialog.

Further, in a printer driver, a print template function is installed which exports and applies "favorite" print attributes to other documents. With regard to a printing method such as a DEVMODE printing and a job definition format (JDF) printing which can output print attribute settings for the entire job together with the exception setting in one file, the print template function can be realized such that the print attributes are exported as one file, stored in a printer driver, and applied to a target document in such printing methods.

However, in a case of printing an XPS document, since the print attributes are associated with each of the hierarchical levels, the print attributes are output as a plurality of files if they are directly exported. Further, it is difficult to identify the page which the print attribute is associated with, so that the print template function cannot be realized.

SUMMARY OF THE INVENTION

The present invention is directed to allow reuse of a print attribute of a document having a hierarchical structure, so that a user can easily set the print attribute to the document having the hierarchical structure.

According to an aspect of the present invention, an information processing apparatus includes a storing unit configured to store, in a storage device, print setting information including a hierarchical structure of a document and a print attribute associated with a hierarchical level of the document, and a setting unit configured to, when the print attribute in the print setting information stored in the storage device is applied to a selected document, compare a hierarchical structure of the selected document and the hierarchical structure of the print setting information and to set a print attribute to an appropriate hierarchical level of the selected document based on a comparison result and the print attribute of the print setting information.

According to another aspect of the present invention, a method for processing information in an information processing apparatus includes storing, in a storage device, print setting information including a hierarchical structure of a document and a print attribute associated with a hierarchical level of the document, and when the print attribute in the print setting information stored in the storage device is applied to a selected document, comparing a hierarchical structure of the selected document and the hierarchical structure of the print setting information and setting a print attribute to an appropriate hierarchical level of the selected document based on a comparison result and the print attribute of the print setting information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 24 is a flowchart illustrating an example of a favorite registration process.

DETAILED DESCRIPTION OF THE EMBODIMENTS

Various exemplary embodiments, features, and aspects of the invention will be described in detail below with reference to the drawings.

Figure 1:
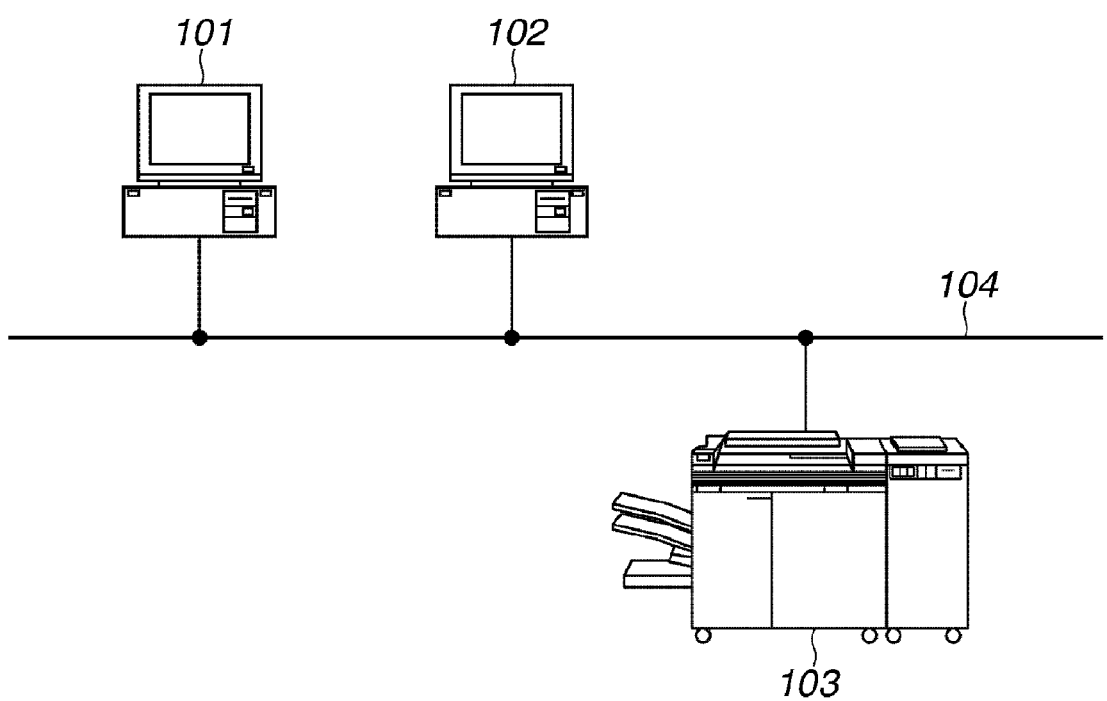
FIG. 1 illustrates an example of a system configuration of a printing system.

FIG. 1 illustrates an example of a system configuration of a printing system.

Referring to FIG. 1, the printing system includes a client PC 101 and a client PC 102 which are examples of an information processing apparatus or a computer, and a printer 103, that can communicate each other via a network 104, i.e., a communication medium. Two similarly configured client PCs 101 and 102 are illustrated to indicate that there is a plurality of client PCs on the network. Hereinafter, only the client PC 101 will be used to describe the present exemplary embodiment.

A plurality of applications for creating documents and a printer driver for outputting application data to the printer 103 are installed in the client PC 101. Functions other than the printer driver (such as a hot folder) for outputting the application data to the printer 103 can be installed in the client PC 101 as long as the functions can set print attributes.

Figure 2:
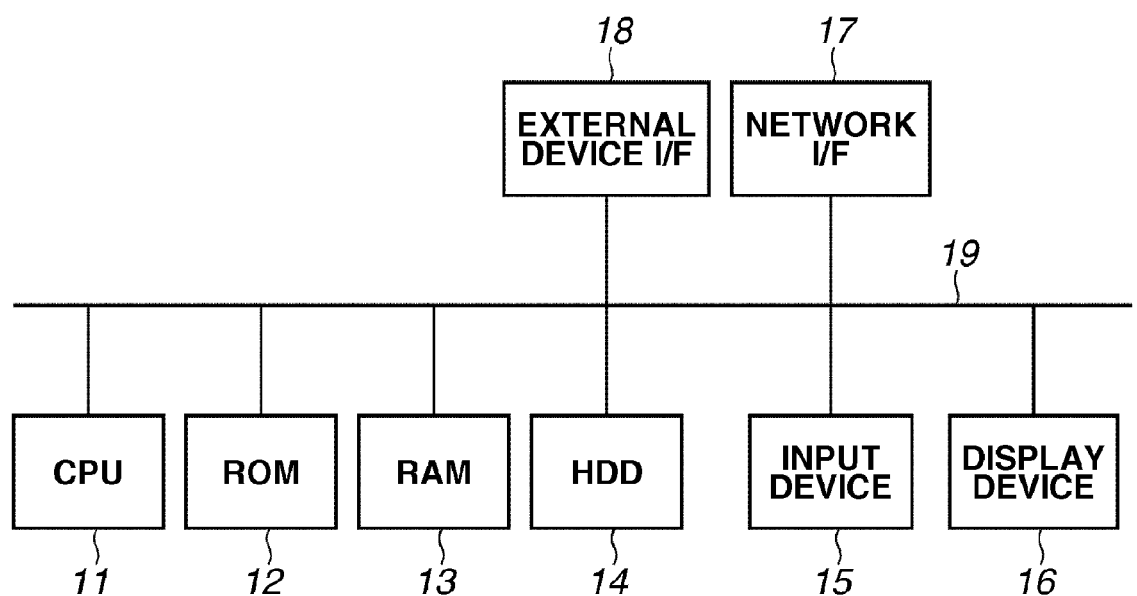
FIG. 2 illustrates an example of a hardware configuration of a client personal computer (PC).

FIG. 2 illustrates an example of a hardware configuration of the client PC.

Referring to FIG. 2, a central processing unit (CPU) 11 controls each of the processes performed by the client PC. A read-only memory (ROM) 12 is non-rewritable and stores programs and data related to each of the processes performed by the client PC. A random access memory (RAM) 13 is rewritable and electrically stores temporary data related to each of the processes performed by the client PC.

The client PC stores programs and data, temporary data, and application data related to each of the processes performed by the client PC in a hard disk drive (HDD) 14.

An input device 15 is a keyboard and a pointing device for inputting an instruction to the client PC. A display device 16 displays an operation status of the client PC and information output from each program operating on the client PC.

A network interface (I/F) 17 connects to a local area network (LAN) and the Internet via the network and exchanges information with external devices. An external device I/F 18 connects to external storage devices. The above-described devices are connected to each other via a system bus 19 and exchange data.

The CPU 11 realizes functions (or processes) of an operating system (OS) or the printer driver to be described below, by executing processes based on programs that correspond to the OS and the printer driver stored in the HDD 14.

FIGS. 3 to 9 illustrate examples of a GUI of the printer driver including page exception settings and print attribute settings.

The printer driver displays on the display device 16 a GUI (an operating screen or a tab sheet) which has a display screen structure suitable for a user to instruct an output operation, such as printing by the printer 103. The printer driver sets setting parameters of print attributes (print attributes) desired by the user according to a user key operation. Further, the printer driver performs control to transmit the set print attributes to a transmission destination (or an output destination) device, such as a printer, via a communication medium, e.g., a network, together with an image data (document data or a document) desired by the user.

Further, the printer driver displays a GUI for setting the print attributes on the display device 16 according to the user key operation. When the user issues an instruction to display a tab sheet related to a "printer" by the key operation on the GUI, the printer driver displays the tab sheet related to the "printer" on the display device 16.

Figure 3:
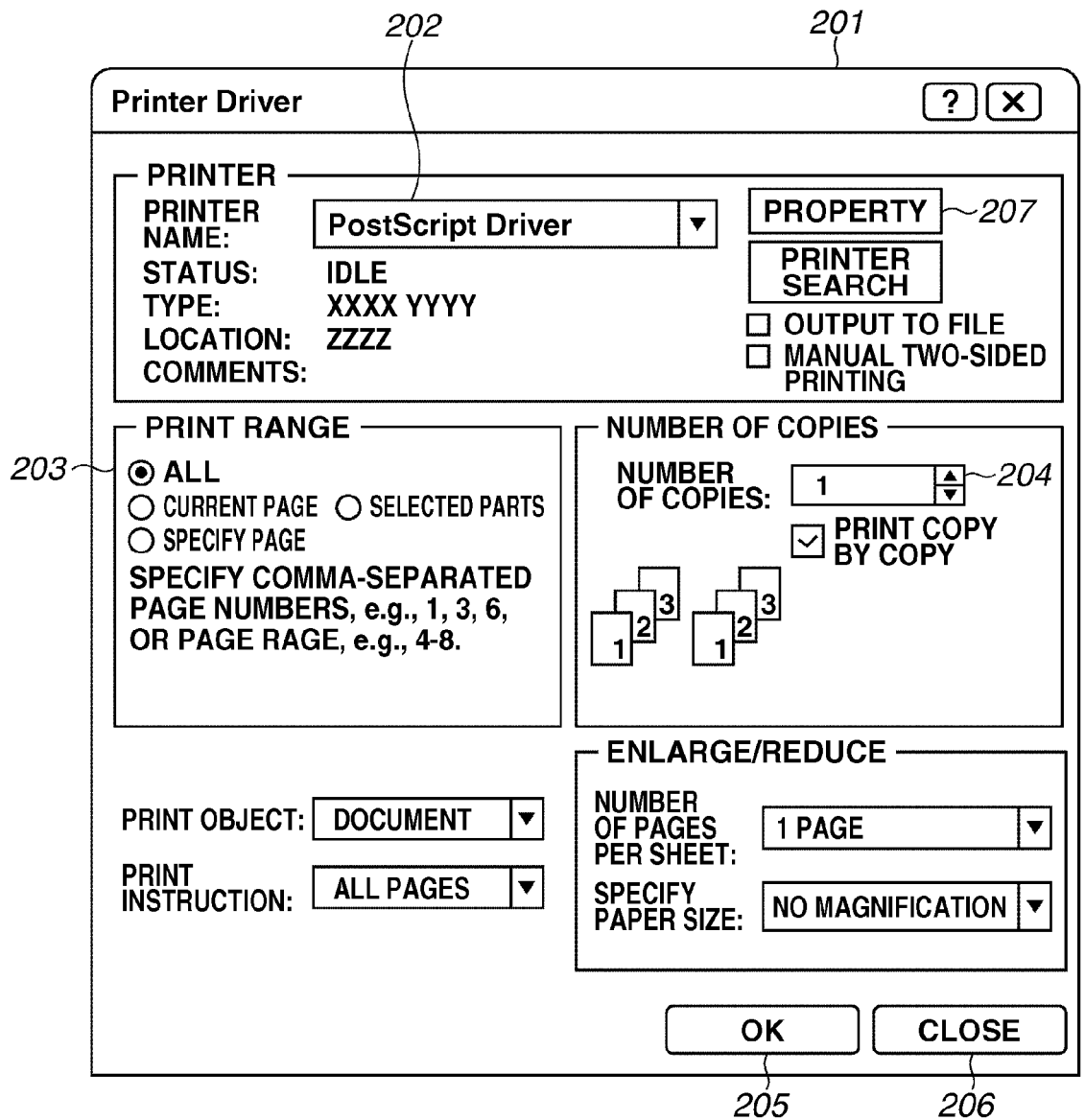
FIG. 3 illustrates an example of a graphical user interface (GUI) of a printer driver including page exception settings and print attribute settings.

Referring to FIG. 3, a printer driver window 201 which is a tab sheet for setting the print attributes includes a transmission destination selection column 202 for selecting a target output destination. The user selects a desired output destination (transmission destination) device in the present system via the transmission destination selection column 202 displayed on the screen.

A page setting control 203 is used to select a page to be output from a job. The user uses the page setting control 203 to determine which page in image data created by application software operating on the client computer is to be output. The printer driver thus allows the user to select a page to be printed out in the output destination device, e.g., a printer, in the present system via the page setting control 203 displayed on the screen. Further, the printer driver allows the user to print all pages or a specific page using the page setting control 203.

A copy number setting control 204 is used to specify a number of copies of the job to be printed out by the output destination device, e.g., the printer, in the present system. The user can increase or decrease the number of copies by moving a cursor to the copy number setting control 204 and clicking on one of arrows of a scroll bar set on the copy number setting control 204.

A property key 207 is used to specify detailed settings of the output destination device selected in the transmission destination selection column 202. When the user presses the property key 207 (i.e., inputs a cue), the printer driver responds and performs control to display on the display device 16 various detail screens illustrated in FIGS. 4 to 9. After the user finishes specifying the desired settings via the various operation screens illustrated in FIGS. 3 to 9, printing can be started according to the settings desired by the user by pressing an OK button 205. On the other hand, the user can cancel the settings by pressing a close key 206. As a result, the printer driver discards the previous user settings and terminates displaying the printer driver window 201.

FIGS. 4 to 9 illustrate GUIs that the printer driver displays on the display device 16 in response to the user pressing the property key 207 on the operation screen illustrated in FIG. 3.

The GUI includes tab sheets such as "page settings", "finishing", "paper supply", "print quality", and the like. The user can set various detailed print output conditions related to "page settings", "finishing", "paper supply", and "print quality" by pressing on the tab sheets. The user presses a key or the tab sheet using an input device such as a pointing device.

Figure 4:
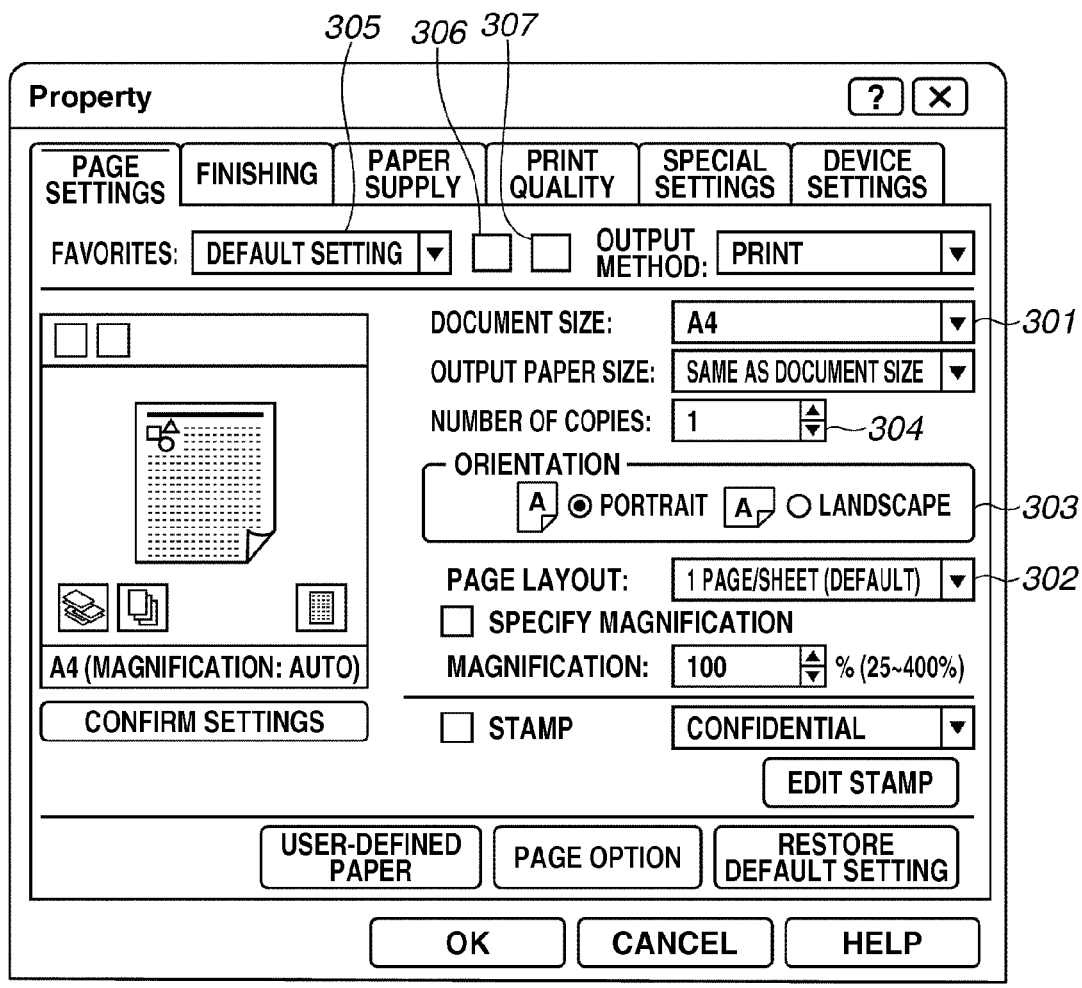
FIG. 4 illustrates an example of an operation screen displayed when a user presses a "page settings" tab.

FIG. 4 illustrates an example of an operation screen displayed when the user presses the "page settings" tab. A "page settings" tab sheet illustrated in FIG. 4 includes portions described below to allow the user to set the desired print attributes using each setting item on the screen.

A paper size setting portion 301 for setting a paper size of a recording sheet for the job to be printed An imposition layout setting portion 302 for selecting a layout mode to arrange and form document image data that corresponds to a plurality of pages on a same side of a recording sheet, and for selecting whether to arrange and form images that corresponds to a plurality of pages on the same side of a recording sheet in the layout mode a paper orientation setting portion 303 for setting a print orientation of the job to be printed from a plurality of options such as portrait and landscape a copy number setting portion 304 for setting the number of copies of the job to be printed.

The user selects "favorite" print attribute settings that the user wants to use from a previously registered "favorite" settings list via a favorite settings portion 305. When the user selects the "favorite", the printer driver automatically sets the print attributes associated with the "favorite" as the current print attributes, and also sets the print attributes on the screen.

Figure 5:
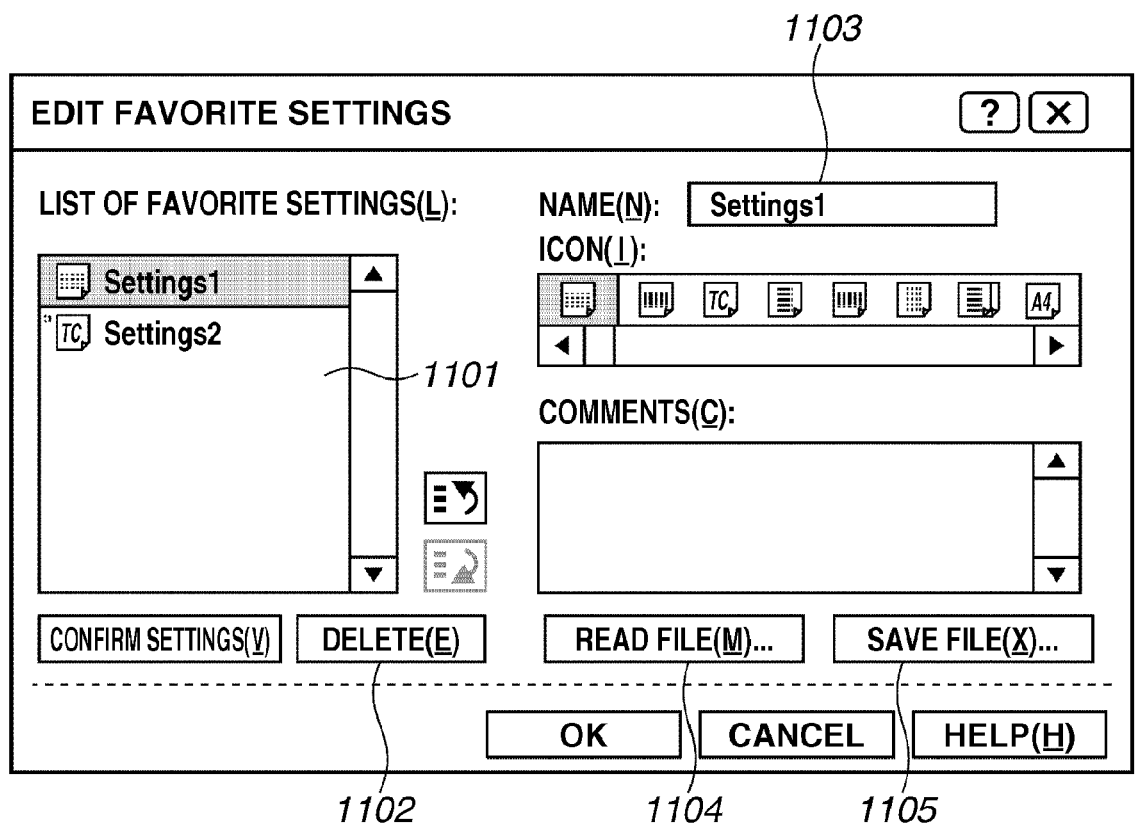
FIG. 5 illustrates an example of a favorite settings editing screen.

When the user presses an add-to-favorite button 306, the printer driver adds the print attributes displayed on the screen when the user pressed the button 306, as a "favorite" to the "favorite" settings list. Further, when the user presses an edit favorite button 307, the printer driver opens (displays) a favorite settings editing screen illustrated in FIG. 5 and allows the user to edit a setting item in the "favorite" settings. FIG. 5 illustrates an example of the favorite settings editing screen. A "favorite" is a function for naming print setting information and registering the print setting information in the printer driver. Further, the name of the "favorite" and the print setting information that corresponds to the name can be added and corrected by the user as necessary.

In the favorite settings editing screen illustrated in FIG. 5, the favorite settings lists that are currently registered are displayed in a favorite settings list display portion 1101. When the user selects a favorite setting in the favorite settings list display portion 1101 and presses a delete button 1102, the printer driver deletes the selected favorite setting. Further, the user can change the name of the selected favorite setting via a name text box 1103.

When the user presses a file read button 1104, the printer driver opens a file selection dialog and reads the favorite setting that is stored as a file and selected via the file selection dialog. The printer driver then registers the read file as the favorite settings. Otherwise, the printer driver extracts print attributes of a file selected by the user via the file selection dialog and registers the extracted print attributes as the favorite settings. Further, when the user presses a save button 1105, the printer driver saves the favorite settings that the user selected in the favorite settings list display portion 1101 as a file.

Figure 6:
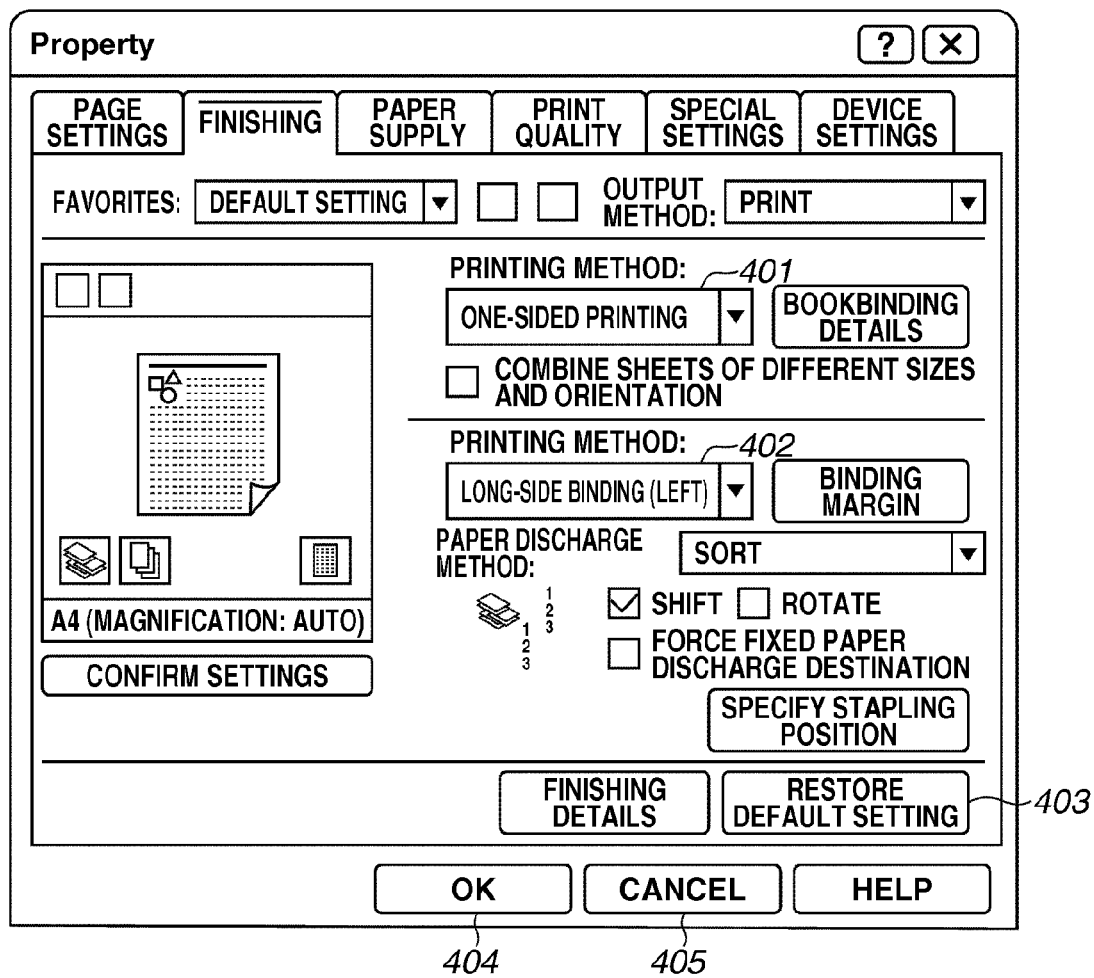
FIG. 6 illustrates an example of an operation screen displayed when a user presses a "finishing" tab.

When the user selects (presses) the "finishing" tab on the operation screen illustrated in FIG. 4 by a key operation, the printer driver displays an operation screen illustrated in FIG. 6 on the display device 16.

FIG. 6 illustrates an example of an operation screen displayed when the user presses the "finishing" tab. The "finishing" tab sheet illustrated in FIG. 6 includes a plurality of setting portions in which the user can specify unique setting information related to the output destination device. The unique setting information is selected from among the output destination devices installed in the system by the user on the operation screen illustrated in FIG. 3. The setting information includes information about sheet processing settings including finishing settings such as stapling, sorting, punching, perforating, and book binding, and settings related to one-sided/two-sided printing. The setting information can include various detailed settings for fine adjustment associated with image processing used to change color and other printer parameters.

For example, the printer driver controls the printer selected via the operation screen illustrated in FIG. 3 to print a print target job according to a two-sided printing mode which is set by the user via a setting portion 401 in the operation screen illustrated in FIG. 6. Further, the printer driver controls the printer to perform two-sided printing based on a long-side binding setting in the two-sided printing mode set by the user via a setting portion 402. When the user presses a restore default setting button 403 on the operation screen illustrated in FIG. 6, the printer driver performs control to return the print setting details to initial values.

Further, if the user presses an OK button 404, the printer driver enables the user settings and returns to the screen illustrated in FIG. 3. On the other hand, if the user presses a cancel button 405, the printer driver cancels the user settings and returns to the screen illustrated in FIG. 3.

Similarly, the user can press the "paper supply" tab and select or specify a page input bin or the like, or press the "print quality" tab and select or specify a resolution and a halftone setting (not illustrated).

A method for specifying a setting to a certain page or a range of pages, more specifically, a setting that is different from the settings for the entire job (or a setting that is different from the default setting) in the job will be described below. Specifying of a different setting to a certain page or a range of pages is referred to as "specifying page exception settings".

Figure 7:
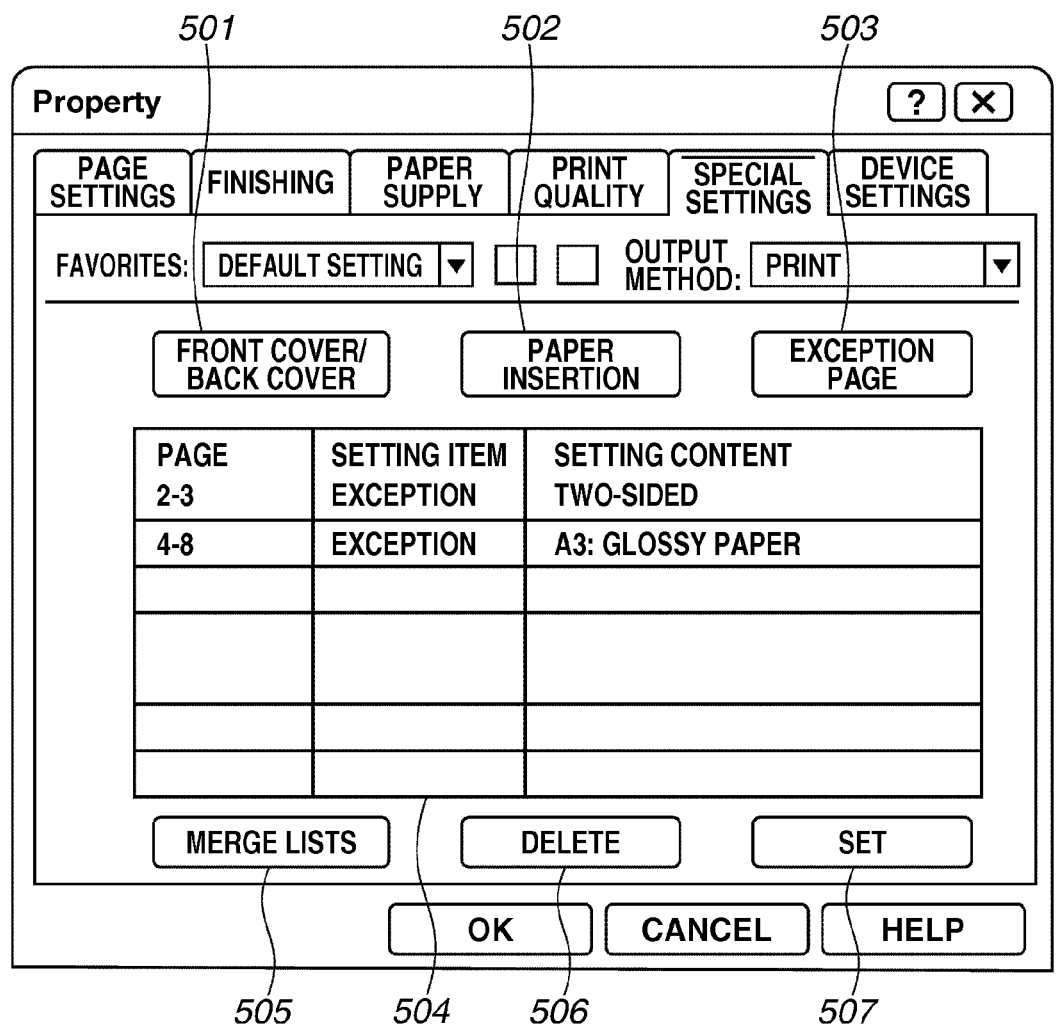
FIG. 7 illustrates an example of an operation screen displayed when a user presses a "special settings" tab.

FIG. 7 illustrates an example of an operation screen displayed when the user presses a "special settings" tab. A "special settings" tab sheet is used to set print attributes to a certain page or a range of pages. More specifically, the attributes set in the "special settings" are different from those set to the entire job via the "page settings" tab sheet illustrated in FIG. 4 and "finishing", "paper supply", and "print quality" tab sheets illustrated in FIG. 6.

In the "special settings" tab sheet illustrated in FIG. 7, a front cover/back cover button 501 is used to set a front cover and a back cover separately from the text data. A paper insertion button 502 is used to set a paper to be inserted separately from the text data. An exception page button 503 is used to specify settings for a certain page or a range of pages that are different from the settings for the entire job. Further, a special settings list 504 displays a list of items that are set different from the entire job by using the above-described buttons 501, 502, and 503. The special settings list 504 includes columns indicating a page or a range of pages to which the setting is to be specified, setting items, and setting contents from left to right. The display in FIG. 7 only illustrates an example, and the printer driver can display the operation screen in other format and other items.

A merge list button 505 is used to merge the list when adjacent pages or range of pages are set the same as to a group of special settings displayed in the special settings list 504. More specifically, the user selects the adjacent settings to be merged from the special settings list 504 and presses the merge list button 505. As a result, the printer driver merges the special settings.

A delete button 506 is used when the user wants to delete a setting among the group of special settings listed in the special settings list 504. The user first selects the setting to be deleted from the special settings list 504 and presses the delete button 506, then the printer driver deletes the setting.

A set button 507 is used when the user wants to change a content of a setting in the group of special settings displayed in the special settings list 504. The user first selects from the special settings list 504 the setting whose content is to be changed and presses the set button 507, then the printer driver changes the setting.

Figure 8:
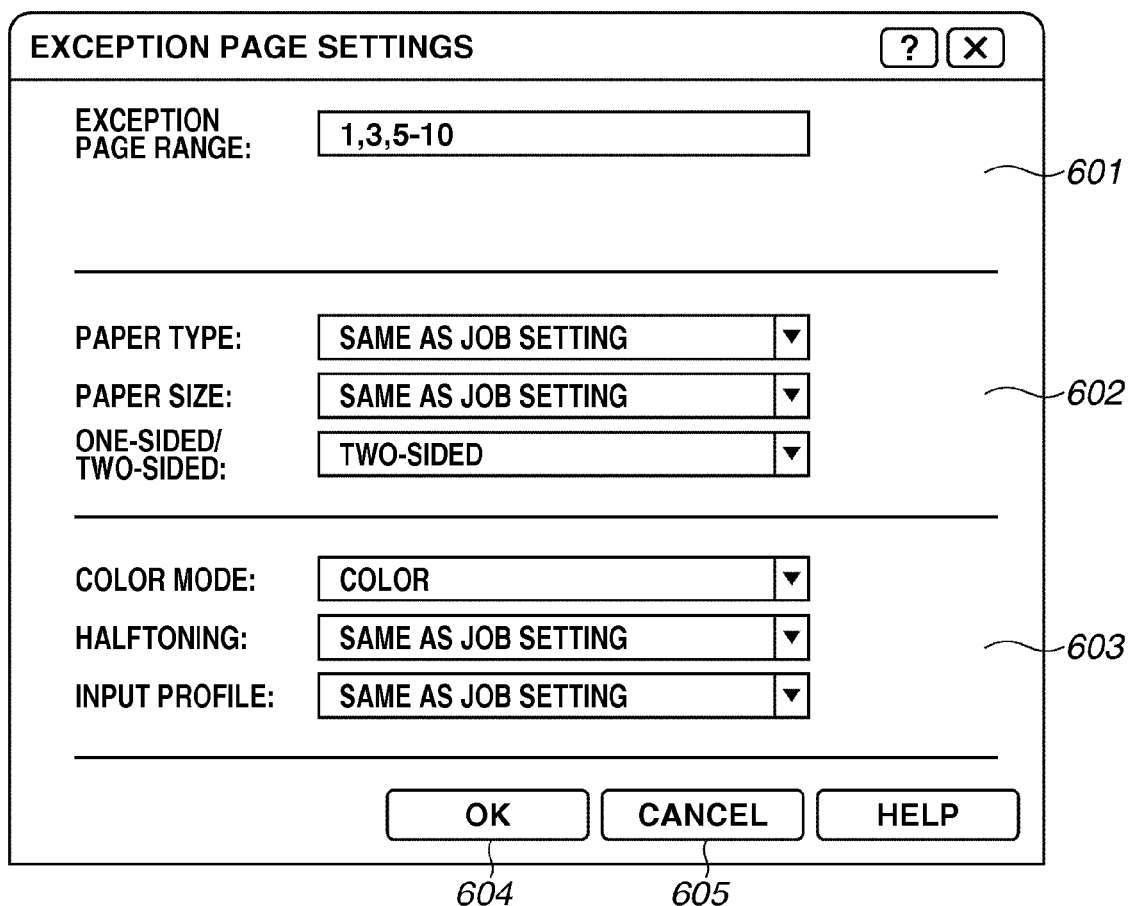
FIG. 8 illustrates an example of a dialog displayed when a user presses an exception page button in a special settings tab sheet illustrated in FIG. 7.

FIG. 8 illustrates an example of a dialog displayed when the user presses the exception page button 503 in the "special settings" tab sheet illustrated in FIG. 7. The user can specify a setting that is different from the settings for the entire job to a specific page or a range of pages by using the dialog illustrated in FIG. 8.

Referring to FIG. 8, a control 601 is used to set a page or a range of pages to which a setting is made. If the user wants to specify a certain page, the user enters the same page number to a start page and an end page to apply page exception setting, so that values set by controls described below are applied only to the page.

A control 602 is used to specify a setting that is different from the settings for the entire job to the page or the range of pages set in the control 601. A setting as to a media can be specified using the control 602. More specifically, a paper type, a paper size, and one-sided/two-sided printing can be set using the control 602.

A control 603 is used to specify a setting that is different from the settings of the entire job to the page or the range of pages set using the control 601. More specifically, a color mode, half-toning, and input profile can be set using the control 603.

The user specifies a desired setting using the various controls illustrated in FIG. 8 and presses an OK button 604, so that the desired setting is applied. If the setting is to be cancelled, the user presses a cancel button 605. Consequently, the printer driver discards the setting content and ends displaying the dialog illustrated in FIG. 8.

As described above, the user can specify the page exception setting using the "special settings" tab sheet illustrated in FIG. 7 and the "exception page setting" dialog illustrated in FIG. 8. The above-described page exception setting method is an example, and the page exception setting can be specified using other methods.

Figure 9:
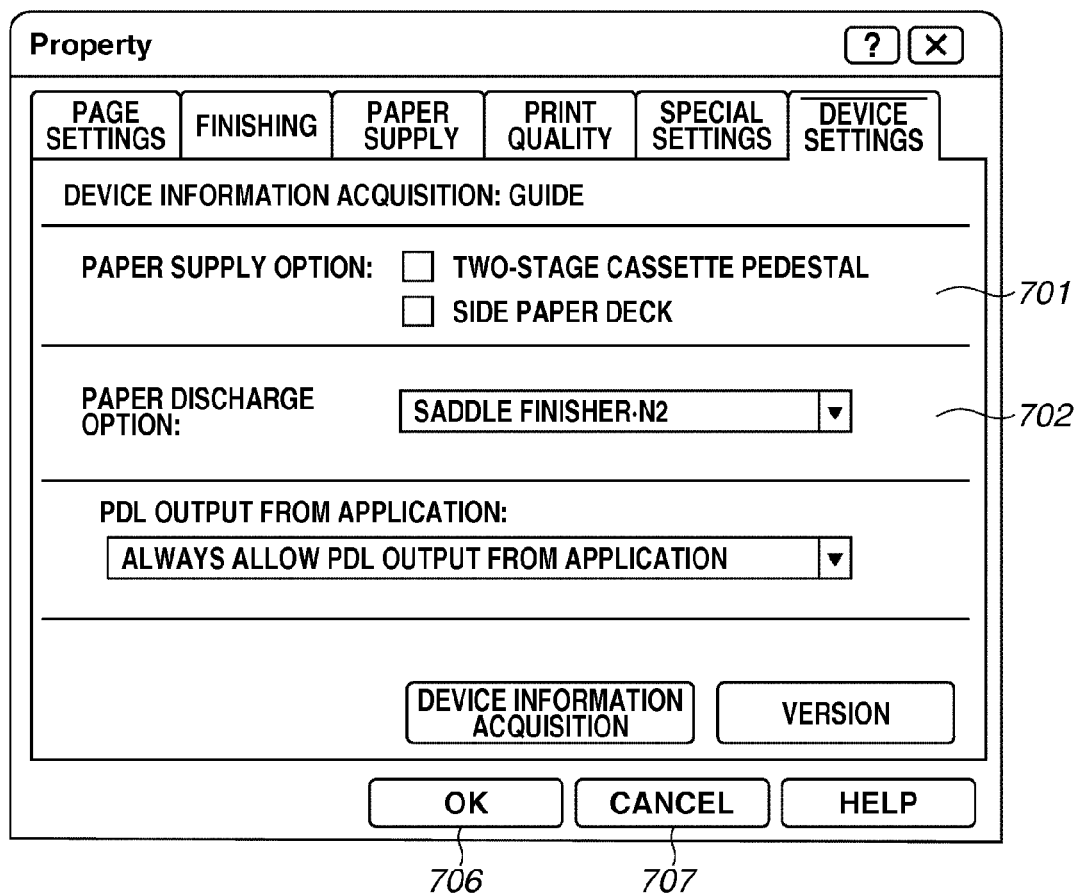
FIG. 9 illustrates an example of an operation screen displayed when a user presses a "device settings" tab.

FIG. 9 illustrates an example of an operation screen displayed when the user presses a "device settings" tab on the tab sheet illustrated in FIG. 4. The user can specify configuration information of the output destination device and printer driver settings by using the tab sheet illustrated in FIG. 9.

A control 701 is used to set a paper supply option to be installed, and a control 702 is used to set a paper discharge option to be installed. The user specifies a desired setting using the various controls illustrated in FIG. 9 and presses an OK button 706, so that the desired setting is applied. If the setting is to be cancelled, the user presses a cancel button 707. The printer driver then discards the setting content and returns to the screen illustrated in FIG. 3.

Figure 10:
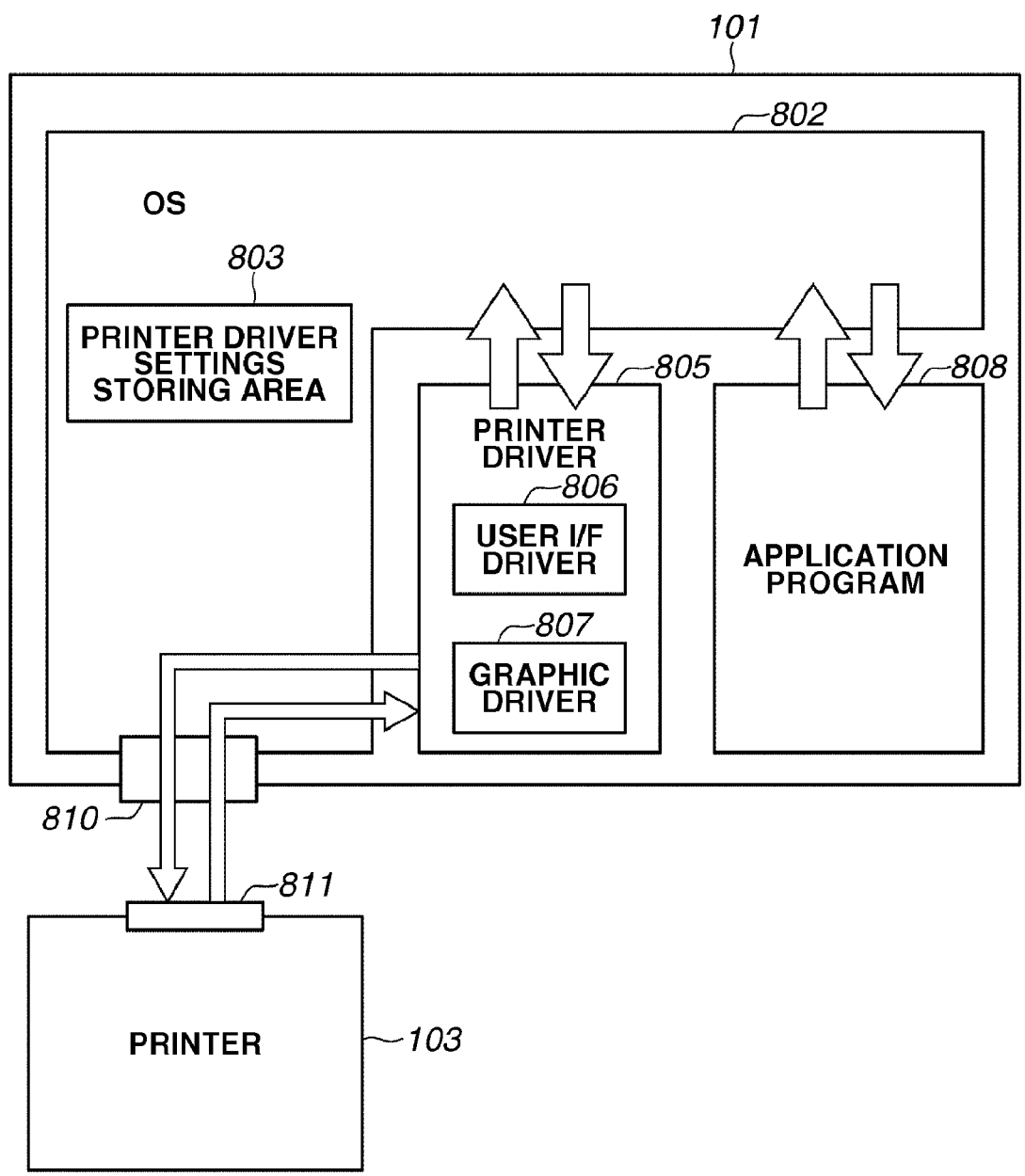
FIG. 10 illustrates an example of a software configuration inside a client PC including a printer driver.

FIG. 10 illustrates an example of a software configuration inside the client PC 101 including the printer driver. An OS 802 is installed in the client PC 101, and a printer driver 805 and application software (application program) 808 perform processes together with the OS 802.

The printer driver 805 includes a user I/F driver 806 and a graphic driver 807. The user I/F driver 806 displays a user interface (UI) and saves settings. The graphic driver 807 converts a print rendering instruction received from the application program 808 via the OS 802 into a code that can be interpreted by the printer. If the application program 808 instructs a setting of a print attribute via the OS 802, the user I/F driver 806 displays the print attribute setting dialog and the tab sheets illustrated in FIGS. 3 to 9 on the display device 16.

The print attributes set by the user via the user I/F driver 806 are stored in a printer driver setting storage area 803 within a storage area which is controlled by the OS 802. Further, the user I/F driver 806, the graphic driver 807, and the application program 808 can access the printer driver setting storage area 803 via the OS 802 and read the print attributes set by the user.

Further, a communication I/F 810 of the client PC 101 and a communication I/F 811 of the printer 103 are connected by a communication medium such as a network. The graphic driver 807 can transmit print data to the printer 103 via the OS 802. Further, the graphic driver 807 can acquire configuration information and status information about the printer 103 via the OS 802.

A process flow in which the user selects a print menu from an application menu, sets print attributes on the printer driver, and performs printing, will be describe below.

Figure 11:
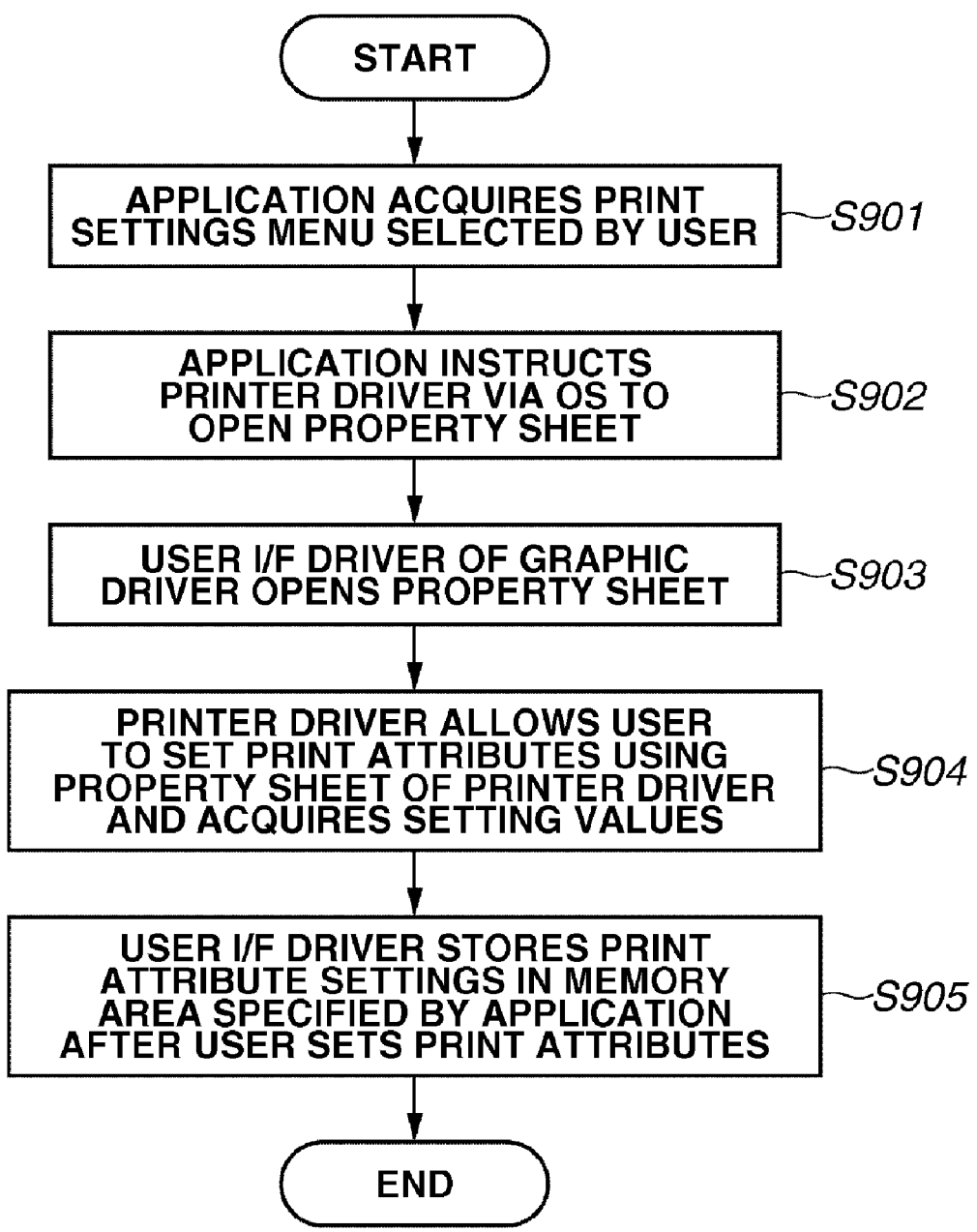
FIG. 11 is a flowchart illustrating an example of a print attribute setting process.

FIG. 11 is a flowchart illustrating an example of a print attribute setting process.

In step S901, the application program 808 acquires a print attribute setting menu selected by the user.

In step S902, the application program 808 calls an application programming interface (API) of the OS 802 and instructs the printer driver 805 to display a tab sheet for setting the print attributes. At this time, the application program 808 obtains an area in a memory for storing the print attributes (i.e., a print attribute setting area), and designates the print attribute setting area to the API. When the instruction is received, the OS 802 instructs the printer driver 805 to display the tab sheet for setting the print attributes.

In step S903, upon receiving the instruction, the user I/F driver 806 in the printer driver 805 displays the tab sheet for setting the print attributes illustrated in FIG. 3.

In step S904, the printer driver 805 acquires setting values related to the print attributes set in the tab sheet or the dialog illustrated in FIGS. 3 to 9 described above. The set print attributes are fixed when the user presses the OK button 205 in the tab sheet illustrated in FIG. 3 after the user sets the print attributes.

When the user presses the OK button 205, in step S905, the user I/F driver 806 in the printer driver 805 stores the setting values related to the print attributes set by the user in the print attribute setting area instructed by the API call in step S902. As a result, the print attributes are set and the setting values related to the print attributes are stored.

Figure 12:
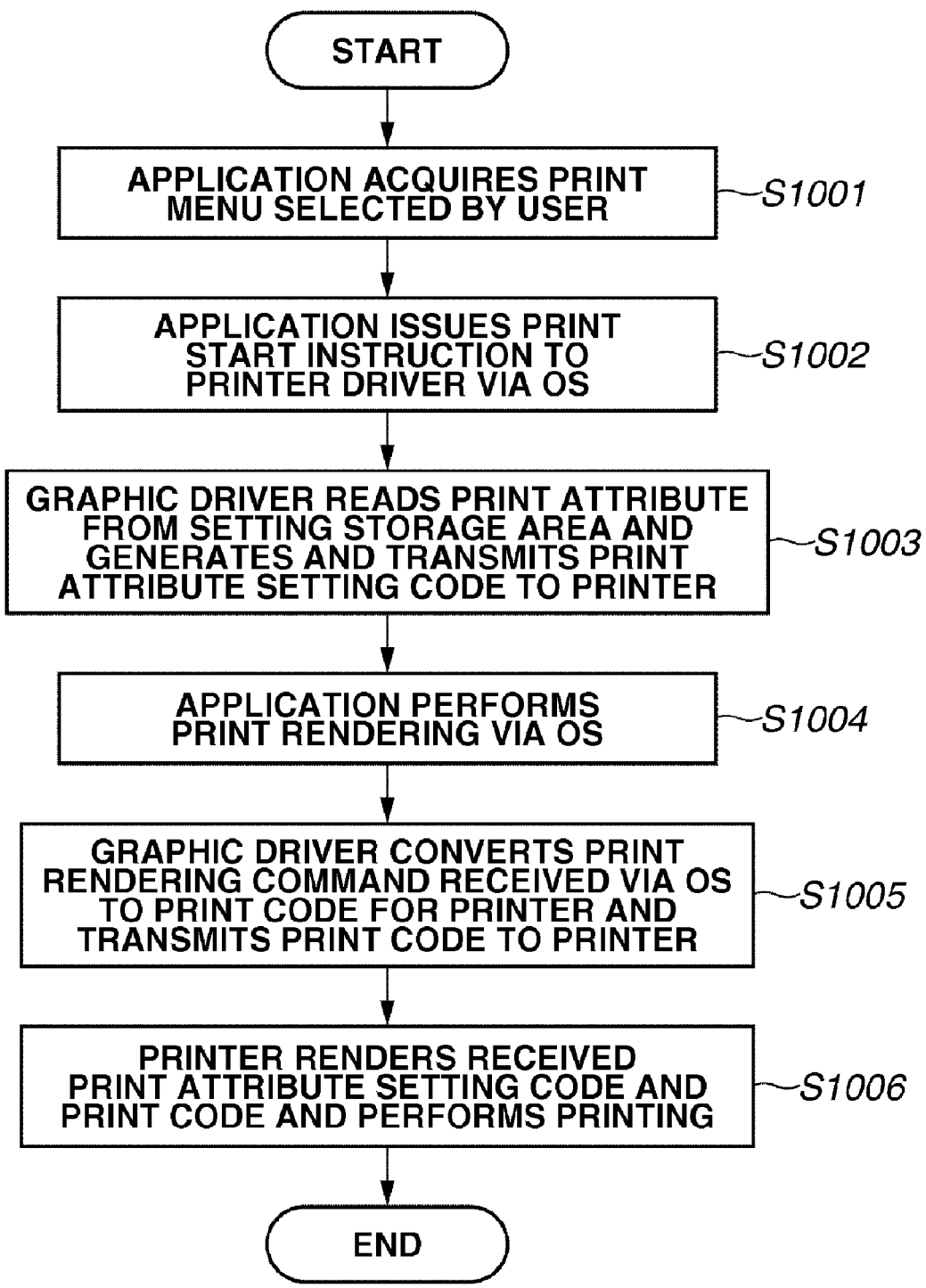
FIG. 12 is a flowchart illustrating an example of a printing process.

FIG. 12 is a flowchart illustrating an example of a printing process.

In step S1001, the application program 808 acquires the print menu selected by the user.

In step S1002, the application program 808 calls the API of the OS 802 and instructs the printer driver 805 to start printing. In this process, the printer driver 805 may once display the tab sheet for setting the print attributes illustrated in FIG. 3. Before instructing print start, the application program 808 designates the print attribute setting area in the memory to the API in the OS 802. Upon receiving the print instruction, the OS 802 instructs the printer driver 805 to start printing.

In step S1003, the graphic driver 807 in the printer driver 805 reads out the setting values of the print attributes stored in the print attribute setting area designated in the print start instruction. The graphic driver 807 then generates a print attribute setting code and transmits the generated code to the printer 103 to instruct printing.

In step S1004, the application program 808 performs print rendering via the OS 802 based on the document data.

In step S1005, the graphics driver 807 which received the print rendering instruction via the OS 802 converts the print rendering instruction to a print code that can be interpreted by the printer 103 and transmits the print code to the printer 103.

In step S1006, the printer 103 renders the received print rendering code and performs printing. Then, the print job is completed.

By the above-described processes, the user can set print attributes and obtain a printout.

Figure 13:
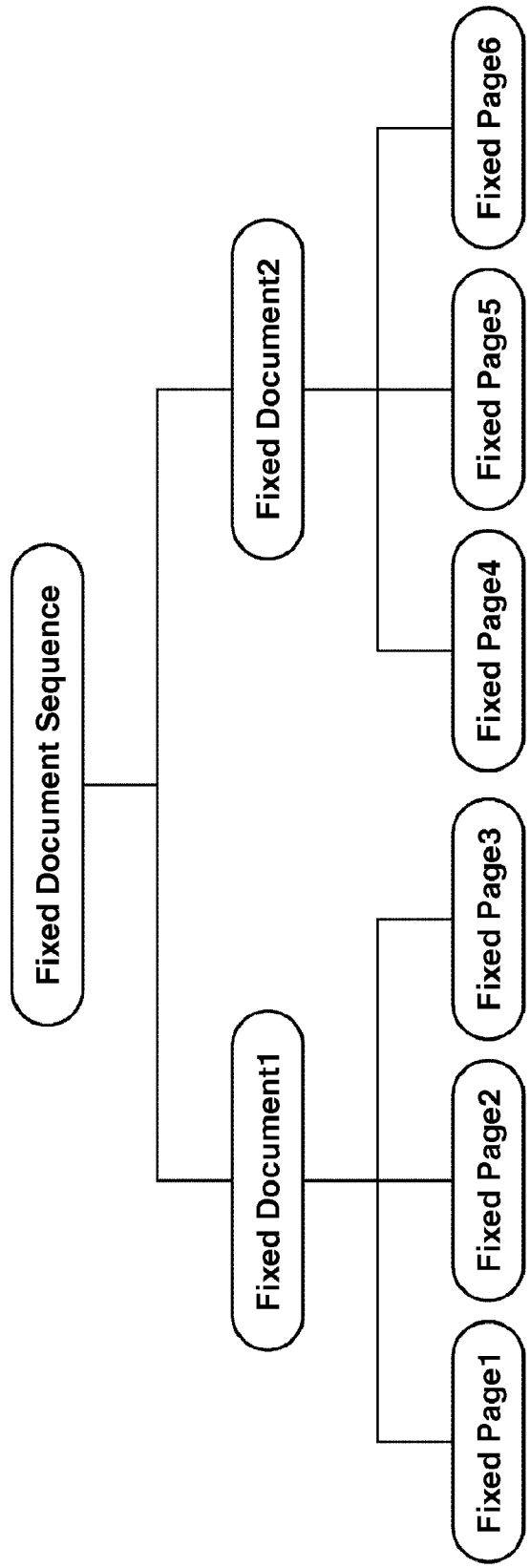
FIG. 13 illustrates an example of a document having a hierarchical structure.

A problem which arises when a favorite function of the printer driver 805 is applied to a document which has a hierarchical structure as illustrated in FIG. 13 will be describe below. FIG. 13 illustrates an example of a document which has a hierarchical structure.

A conventional favorite function previously stores a print attribute group associated with a favorite name, and when the favorite name is selected, the favorite function applies settings of the print attribute group associated with the favorite name. The print attribute group can include various print attributes, but does not include a hierarchical structure of a document (hierarchical structure information). Therefore, if a favorite print attribute group is applied to the document which has the hierarchical structure as illustrated in FIG. 13 using the conventional favorite function, the printer driver 805 cannot determine to which hierarchical level the favorite print attribute group is set. Thus, the favorite print attribute group cannot be applied to the document.

To solve such a problem, a method for registering print attributes of an XPS document as a favorite from the printer driver 805, and a process for applying the print attributes of the XPS document registered as the favorite to other XPS documents will be described below.

In a case where the user registers an XPS document as a template using the screen illustrated in FIG. 5, the user presses a file read button 1104, and the printer driver 805 allows the user to select an XPS file in addition to a print attribute file. If the user selects both the XPS file and the print attribute file, the printer driver 805 reads and stores the XPS document including the print attributes and the hierarchical structure of the XPS file as the template.

Figure 14:
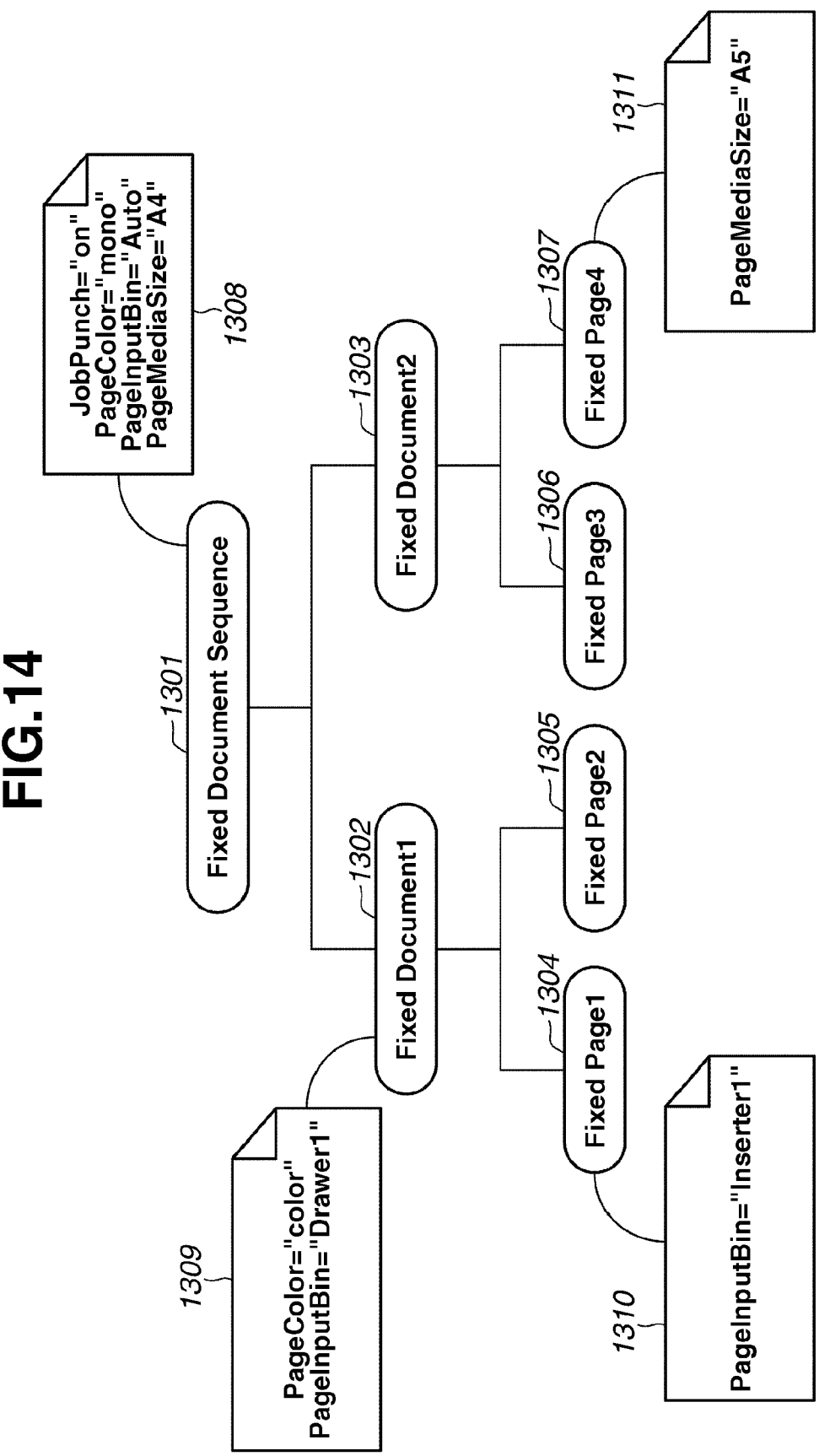
FIG. 14 illustrates an example of a hierarchical structure and print attributes of an XPS document registered as a favorite.

FIG. 14 illustrates an example of a hierarchical structure and print attributes of an XPS document registered as a favorite. Settings described below are specified to the XPS document illustrated in FIG. 14.

A hierarchical structure configured by two sections and each section includes two pages (the hierarchical structure including hierarchical structure parts 1301 to 1307)

Print attributes including "page media size: A4", "page input bin: auto", "page color mode: monochrome", and "job punch: on" (a print ticket 1308) specified to the entire document Exception print attributes "page input bin: Drawer1" and "page color mode: color" (a print ticket 1309) specified to the first section An exception print attribute "page input bin: Inserter1" (a print ticket 1310) specified to the first page of the first section An exception print attribute "page media size: A5" (a print ticket 1311) specified to the second page of the second section According to the present exemplary embodiment, the XPS document in which the print attributes are associated with the hierarchical structure as illustrated in FIG. 14 is registered as the favorite, and the favorite print attributes can be applied to other XPS documents. When the favorite print attributes are applied to the other XPS documents, the exception print attributes that are associated with the hierarchical structure parts can also be applied as the print attributes to the other XPS documents based on processes illustrated in flowcharts of FIGS. 22 and 23 to be described below. Examples in which the favorite is applied to the XPS documents which have a plurality of types of the hierarchical structures will be described below.

Figure 15:
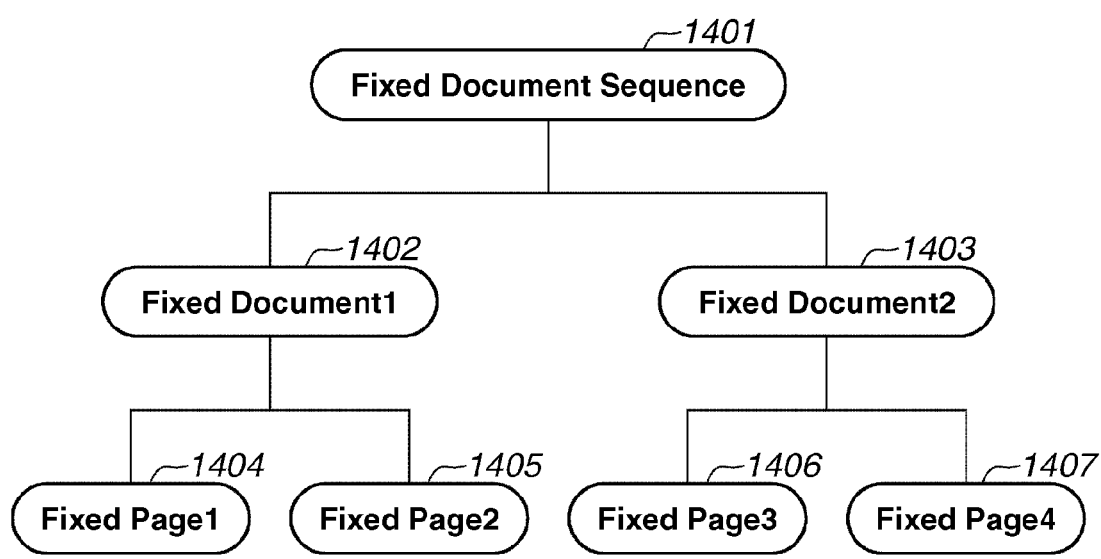
FIG. 15 illustrates an example of a document having a hierarchical structure.

A case where the XPS document illustrated in FIG. 14 is applied as the favorite to an XPS document which has a hierarchical structure illustrated in FIG. 15 will be described. FIG. 15 illustrates an example of a document which has a hierarchical structure. The printer driver 805 acquires the hierarchical structure from the XPS document illustrated in FIG. 15 and compares the acquired hierarchical structure with the hierarchical structure of the XPS document to be applied as the favorite. The hierarchical structure including hierarchical structure parts 1401 to 1407 is similar to the hierarchical structure of the XPS document to be applied which includes the hierarchical structure parts 1301 to 1307. Therefore, the printer driver 805 applies the print tickets 1308 to 1311 to the corresponding hierarchical structure parts in the XPS document illustrated in FIG. 15.

Figure 16:
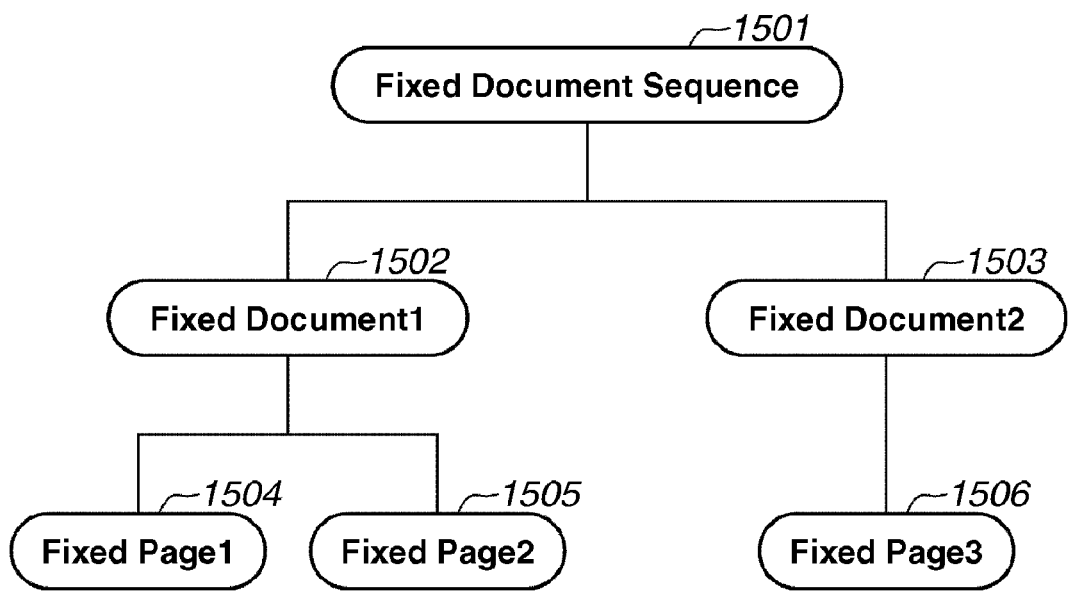
FIG. 16 illustrates an example of a document having a hierarchical structure.
Figure 17:
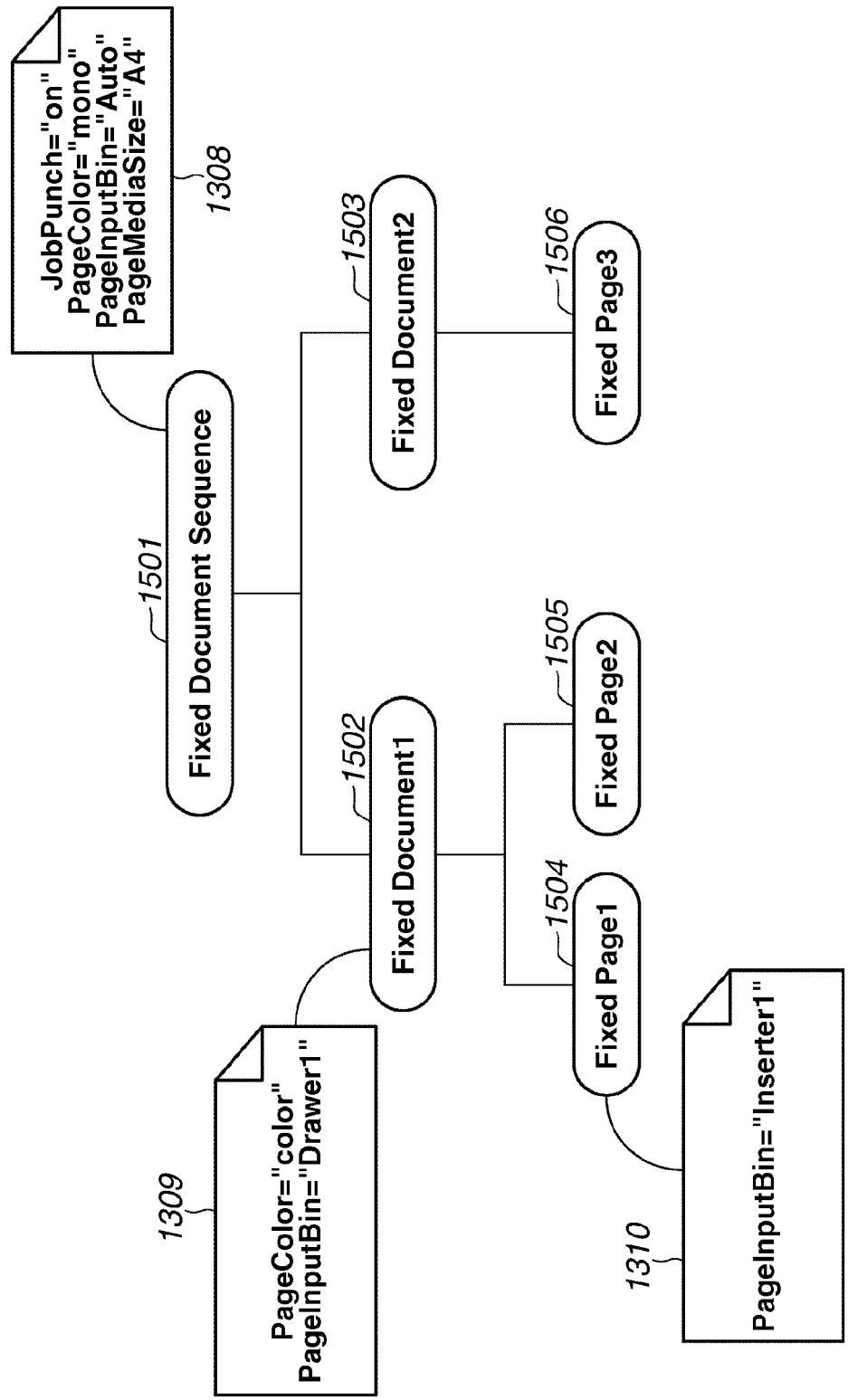
FIG. 17 illustrates an example of applying the print attributes of the XPS document registered as the favorite illustrated in FIG. 14 to the XPS document illustrated in FIG. 16.

A case where the XPS document illustrated in FIG. 14 is applied as the favorite to an XPS document which has a hierarchical structure illustrated in FIG. 16 will be described. FIG. 16 illustrates an example of a document which has a hierarchical structure. The printer driver 805 acquires the hierarchical structure from the XPS document illustrated in FIG. 16. The printer driver 805 then compares the acquired hierarchical structure with the hierarchical structure of the XPS document to be applied as the favorite which includes the hierarchical structure parts 1301 to 1307. Consequently, the hierarchical structure including hierarchical structure parts 1501 to 1506 of the XPS document illustrated in FIG. 16 lacks the hierarchical structure part that corresponds to the hierarchical structure part 1307 which is the second page of the second section. Therefore, the printer driver 805 does not apply the print ticket 1311 which is specified to the hierarchical structure part 1307, to the XPS document which has the hierarchical structure illustrated in FIG. 16. Instead, the print driver 805 applies the print tickets 1308 to 1310 to the corresponding hierarchical structure parts in the XPS document which has the hierarchical structure illustrated in FIG. 16. FIG. 17 illustrates an example in which the favorite XPS document illustrated in FIG. 14 is applied to the XPS document illustrated in FIG. 16.

Figure 18:
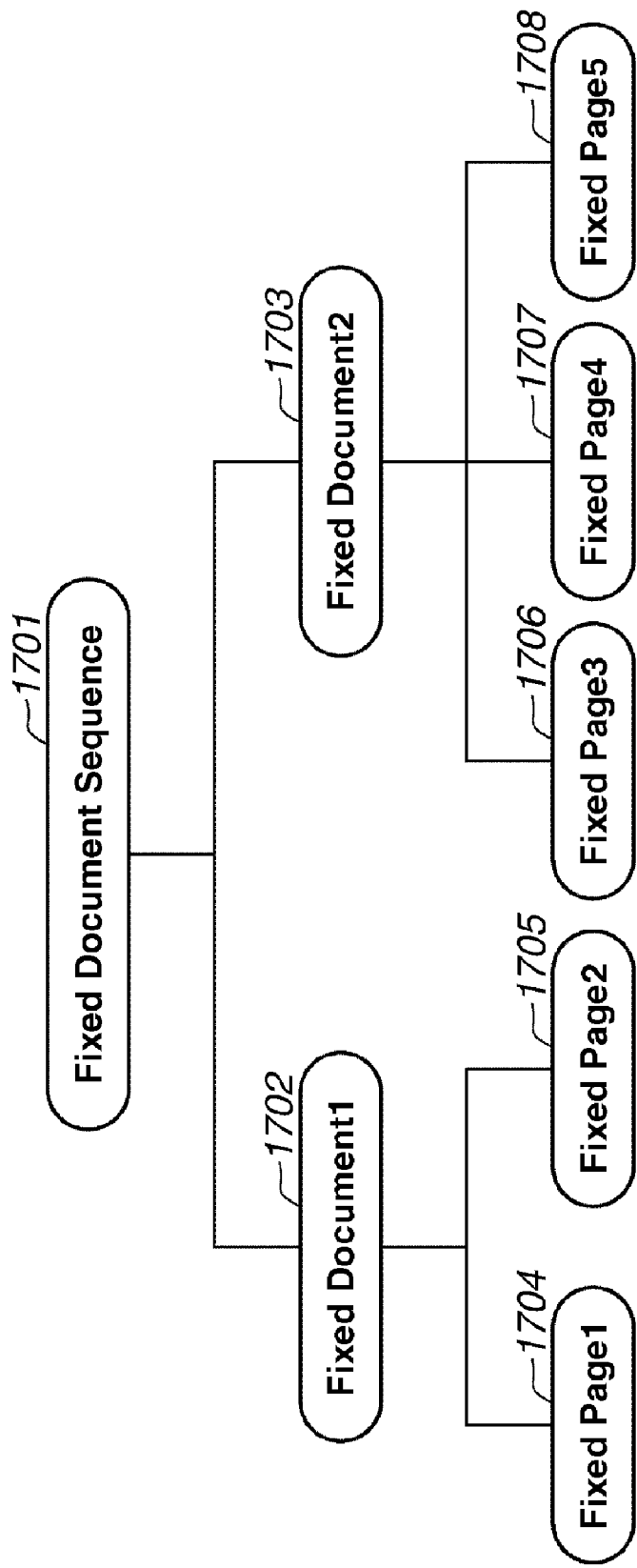
FIG. 18 illustrates an example of a document having a hierarchical structure.

A case where the XPS document illustrated in FIG. 14 is applied as the favorite to an XPS document which has a hierarchical structure illustrated in FIG. 18 will be described. FIG. 18 illustrates an example of a document which has a hierarchical structure. The printer driver 805 acquires the hierarchical structure from the XPS document illustrated in FIG. 18. The printer driver 805 then compares the acquired hierarchical structure with the hierarchical structure of the XPS document to be applied as the favorite.

Figure 19:
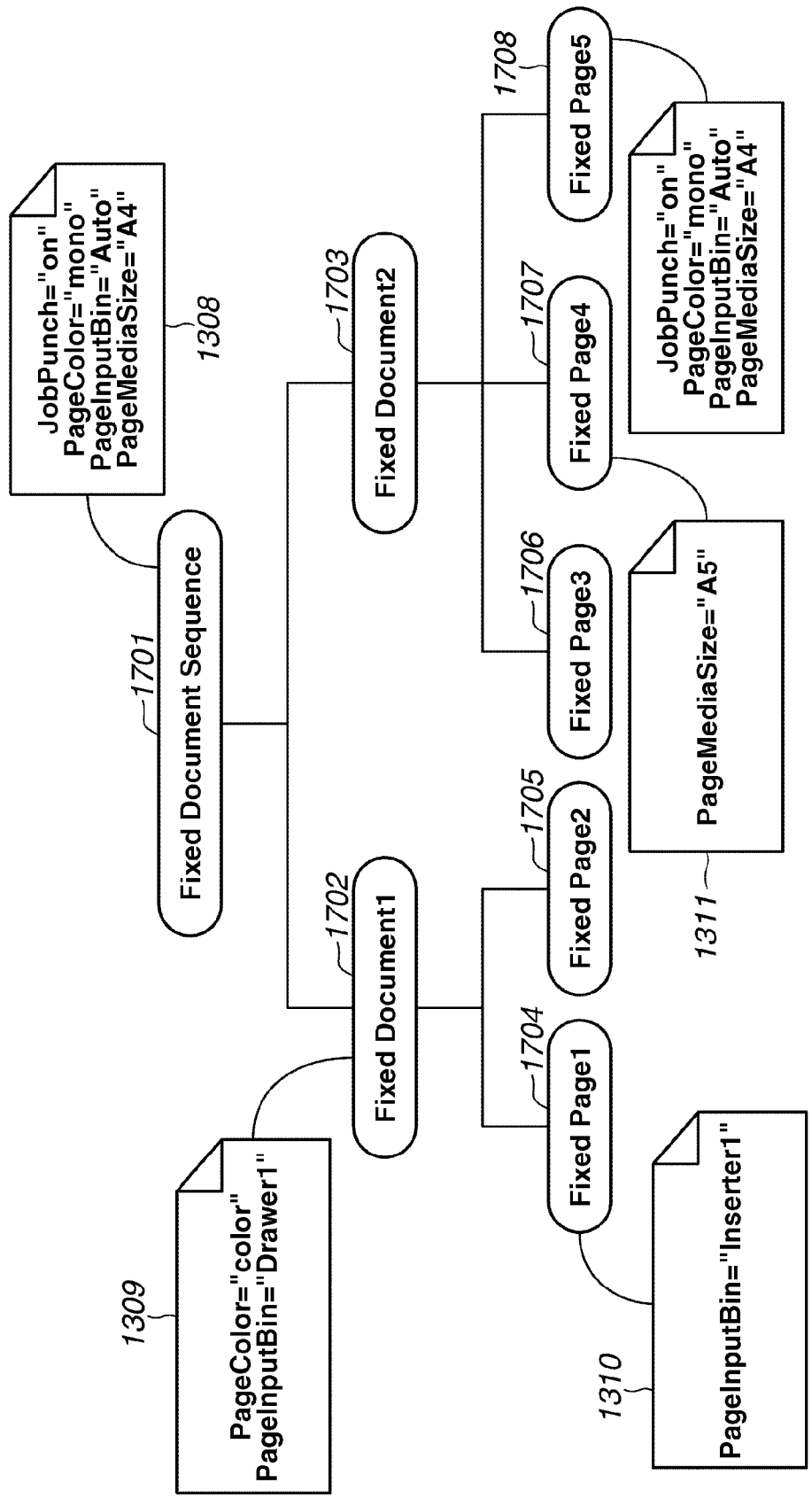
FIG. 19 illustrates an example of applying the print attributes of the XPS document registered as the favorite illustrated in FIG. 14 to the XPS document illustrated in FIG. 18.

The hierarchical structure illustrated in FIG. 18 including hierarchical structure parts 1701 to 1708 is different from the hierarchical structure parts 1301 to 1307 of the XPS document to be applied, in that a number of the hierarchical structure part 1708 corresponding to the third page of the second section is greater. Therefore, the printer driver 805 applies the print tickets 1308 to 1311 to the corresponding hierarchical structure parts. Further, the printer driver 805 applies the print attributes associated with an upper-level hierarchical structure part of the hierarchical structure part 1708 to the hierarchical structure part 1708 (since a print ticket is not specified to the hierarchical structure part 1703, the print ticket 1308 specified to the hierarchical structure part 1701 which is on a further upper level is applied to the hierarchical structure part 1708). FIG. 19 illustrates an example of applying the favorite XPS document illustrated in FIG. 14 to the XPS document illustrated in FIG. 18.

Figure 20:
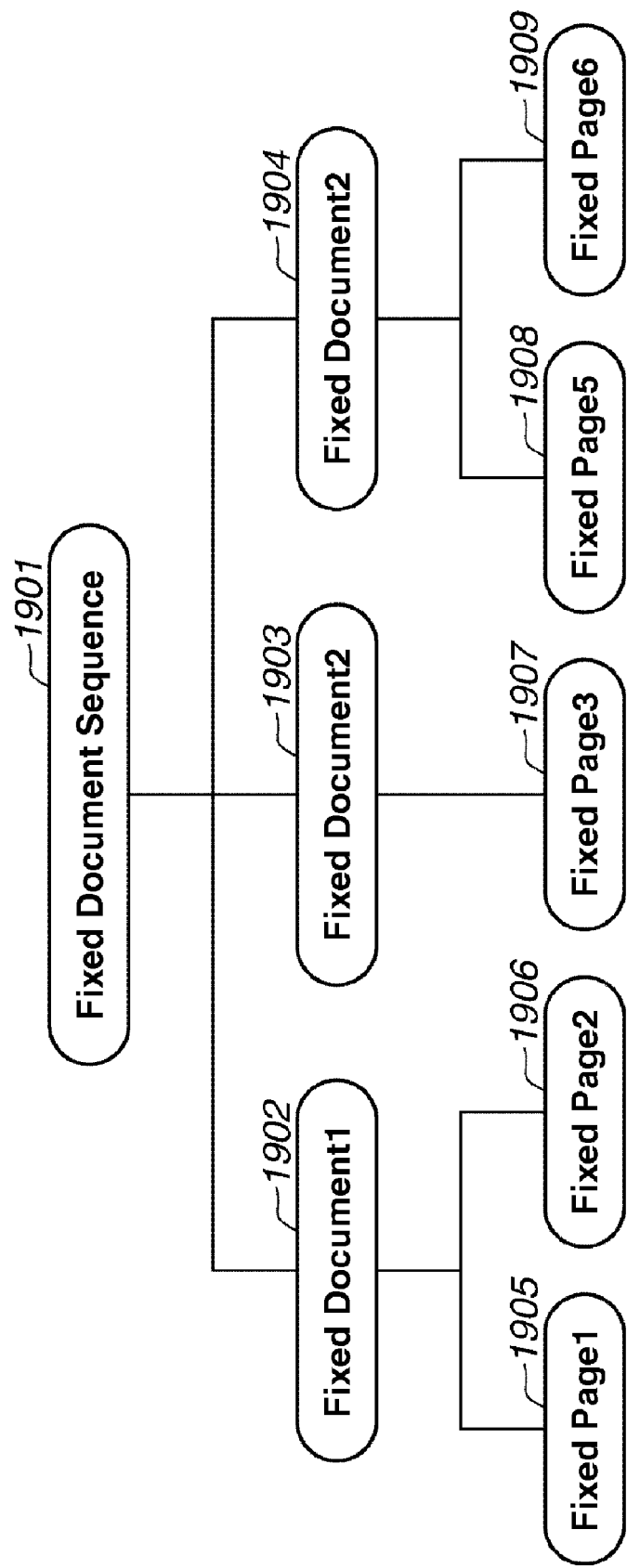
FIG. 20 illustrates an example of a document having a hierarchical structure.

Further, a case where the XPS document illustrated in FIG. 14 is applied as the favorite to an XPS document which has a hierarchical structure illustrated in FIG. 20 will be described. FIG. 20 illustrates an example of a document which has a hierarchical structure. The printer driver 805 acquires the hierarchical structure from the XPS document illustrated in FIG. 20. The printer driver 805 then compares the acquired hierarchical structure with the hierarchical structure of the XPS document to be applied as the favorite which includes the hierarchical structure parts 1301 to 1307. Consequently, the hierarchical structure illustrated in FIG. 20 which includes hierarchical structure parts 1901 to 1909 does not include the hierarchical structure part corresponding to the hierarchical structure part 1307 illustrated in FIG. 14 that corresponds to the second page of the second section. Therefore, the printer driver 805 does not apply the print ticket 1311 specified to the hierarchical structure part 1307.

Figure 21:
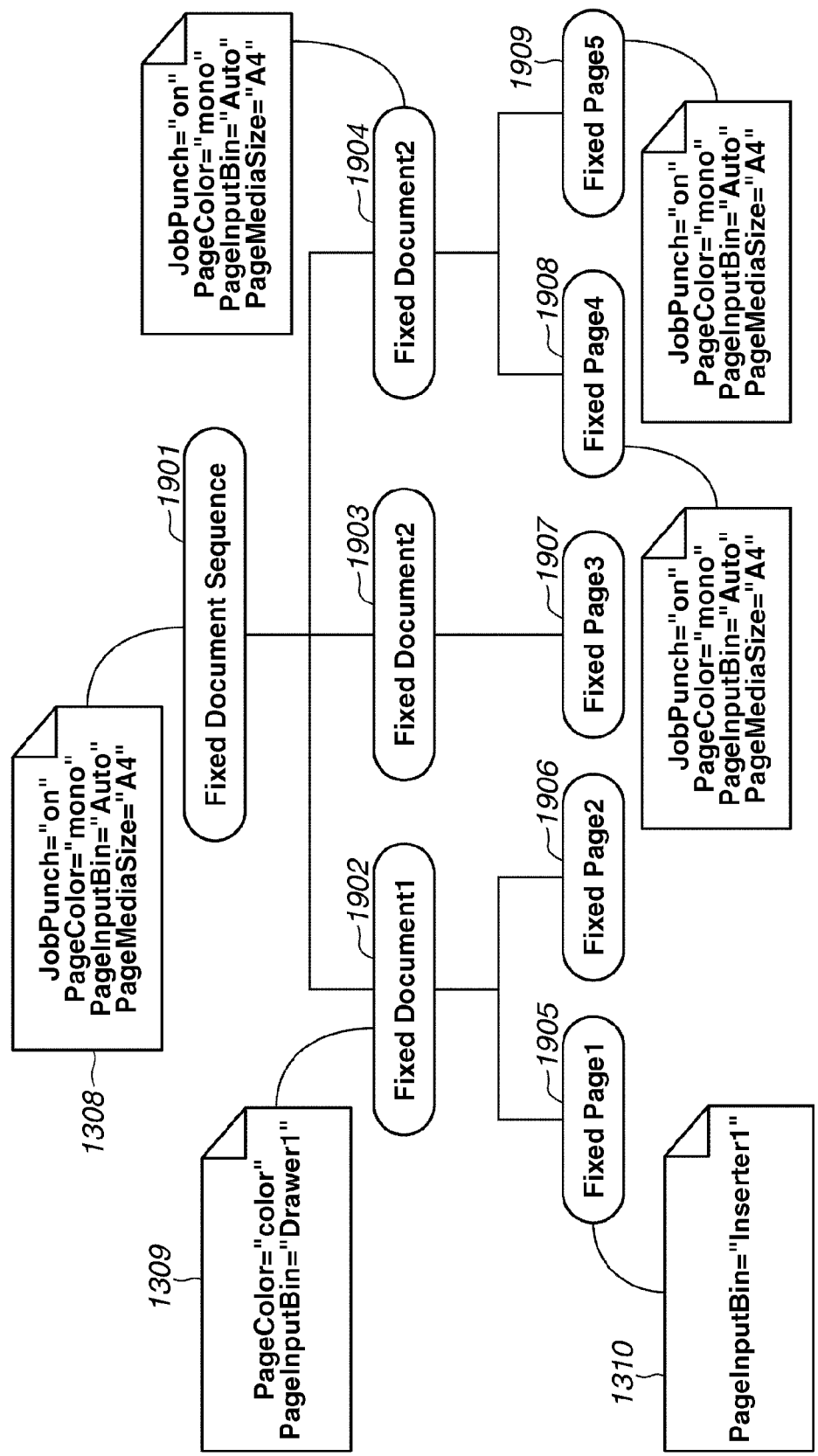
FIG. 21 illustrates an example of applying the print attributes of the XPS document registered as the favorite illustrated in FIG. 14 to the XPS document illustrated in FIG. 20.

Further, the hierarchical structure parts 1901 to 1909 are different from the hierarchical structure parts 1301 to 1307 to be applied as the favorite, in that a number of the hierarchical structure parts 1904, 1908, and 1909 corresponding to the third section in the XPS document is greater. Therefore, the printer driver 805 applies the print attributes specified to the upper-level hierarchical structure part (the print ticket 1308 to be applied to the hierarchical structure 1901) to the hierarchical structure parts 1904, 1908, and 1909. Further, the printer driver 805 applies the print tickets 1308 to 1311 to the corresponding hierarchical structure parts. FIG. 21 illustrates an example in which the favorite XPS document illustrated in FIG. 14 is applied to the XPS document illustrated in FIG. 20.

Figure 22:
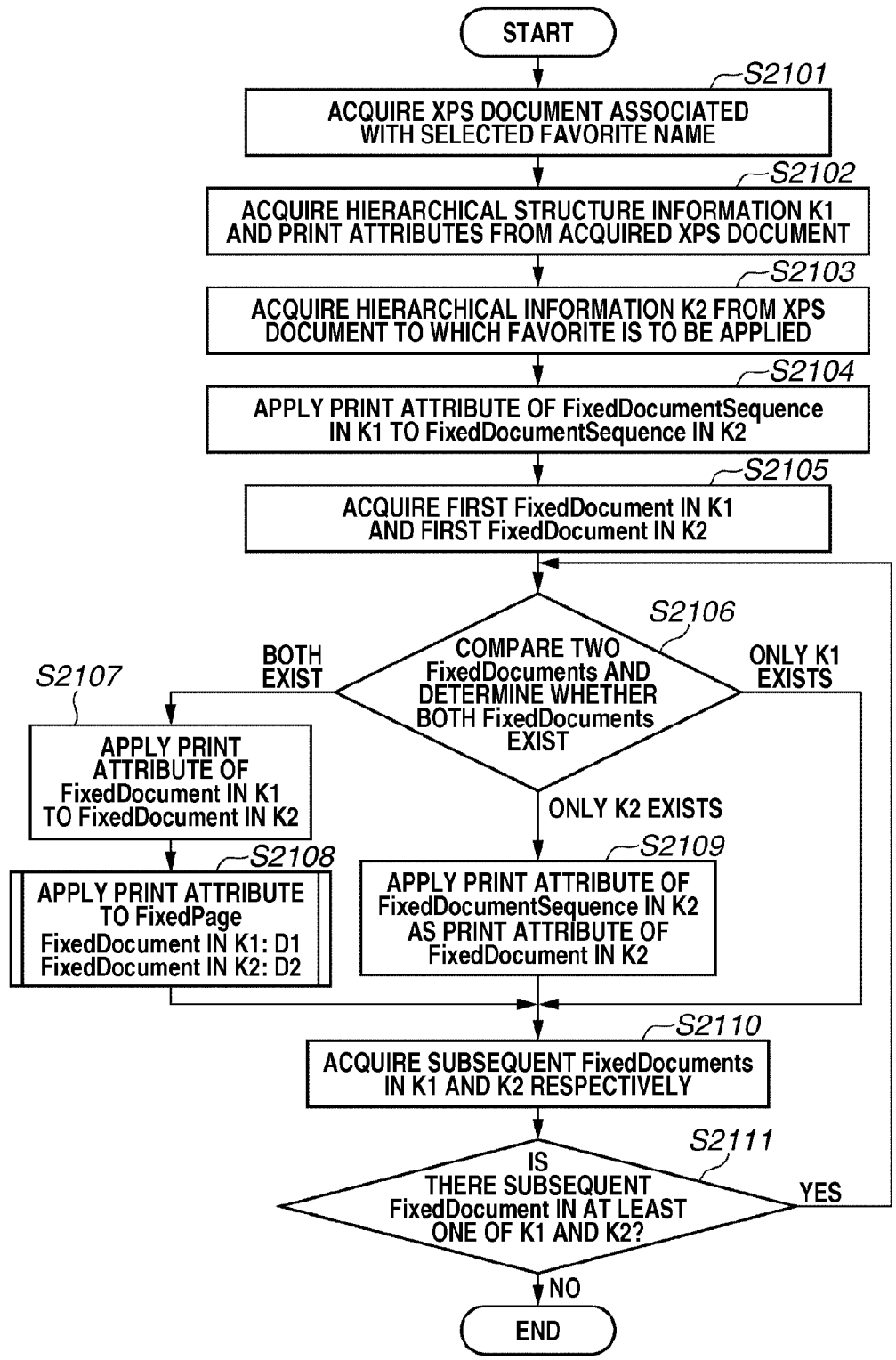
FIG. 22 is a flowchart illustrating an example of a process for applying print attributes of a favorite XPS document to a target XPS document.

FIG. 22 is a flowchart illustrating an example of a process for applying the print attributes of the favorite XPS document to a target XPS document.

In step S2101, the printer driver 805 acquires the XPS document which is associated with the favorite name selected by the user.

In step S2102, the printer driver 805 acquires a hierarchical structure (to be referred to as hierarchical structure information K1) and print attributes from the XPS document acquired in step S2101.

In step S2103, the printer driver 805 acquires hierarchical structure information K2 from the XPS file to which the favorite print attributes will be applied.

In step S2104, the printer driver 805 applies the print attributes of FixedDocumentSequence in the hierarchical structure information K1 to the FixedDocumentSequence in the hierarchical structure information K2.

In step S2105, the printer driver 805 acquires the first FixedDocument of the hierarchical structure information K1 and the first FixedDocument of the hierarchical structure information K2.

In step S2106, the printer driver 805 compares the two FixedDocuments acquired in step S2105. If the printer driver 805 determines that both FixedDocuments exist as a result of the comparison (BOTH EXIST in step S2106), the process proceeds to step S2107. On the other hand, if the printer driver 805 determines that the FixedDocument exists only in the hierarchical structure information K2 (ONLY K2 EXISTS in step S2106), the process proceeds to step S2109. Further, if the printer driver 805 determines that the FixedDocument exists only in the hierarchical structure information K1 (ONLY K1 EXISTS in step S2106), the process proceeds to step S2110.

In step S2107, the printer driver 805 applies (sets) the print attributes of the FixedDocument in the hierarchical structure information K1 to the FixedDocument in the hierarchical structure information K2.

In step S2108, the printer driver 805 applies the print attributes to Fixedpage which belongs to a lower level of the FixedDocument in the hierarchical structure information K2. Hereinafter, the FixedDocument in the hierarchical structure information K1 will be referred to as the FixedDocument D1, and the FixedDocument in the hierarchical structure information K2 will be referred to as the FixedDocument D2. The process performed in step S2108 will be described in detail below with reference to FIG. 23.

In step S2109, the printer driver 805 applies the print attributes of the FixedDocumentSequence in the hierarchical structure information K2 as the print attributes of the FixedDocument D2.

In step S2110, the printer driver 805 acquires subsequent FixedDocuments in the hierarchical structure information K1 and the hierarchical structure information K2 respectively.

In step S2111, the printer driver 805 confirms the two FixedDocuments acquired in step S2110 and determines whether the subsequent FixedDocument exists in either of the hierarchical structure information K1 and the hierarchical structure information K2. If the printer driver 805 determines that the subsequent FixedDocument exists in either the hierarchical structure information K1 or hierarchical structure information K2 (YES in step S2111), the process returns to step S2106. If the printer driver 805 determines that there is no subsequent FixedDocument in either the hierarchical structure information K1 or the hierarchical structure information K2 (NO in step S2111), the process ends.

Figure 23:
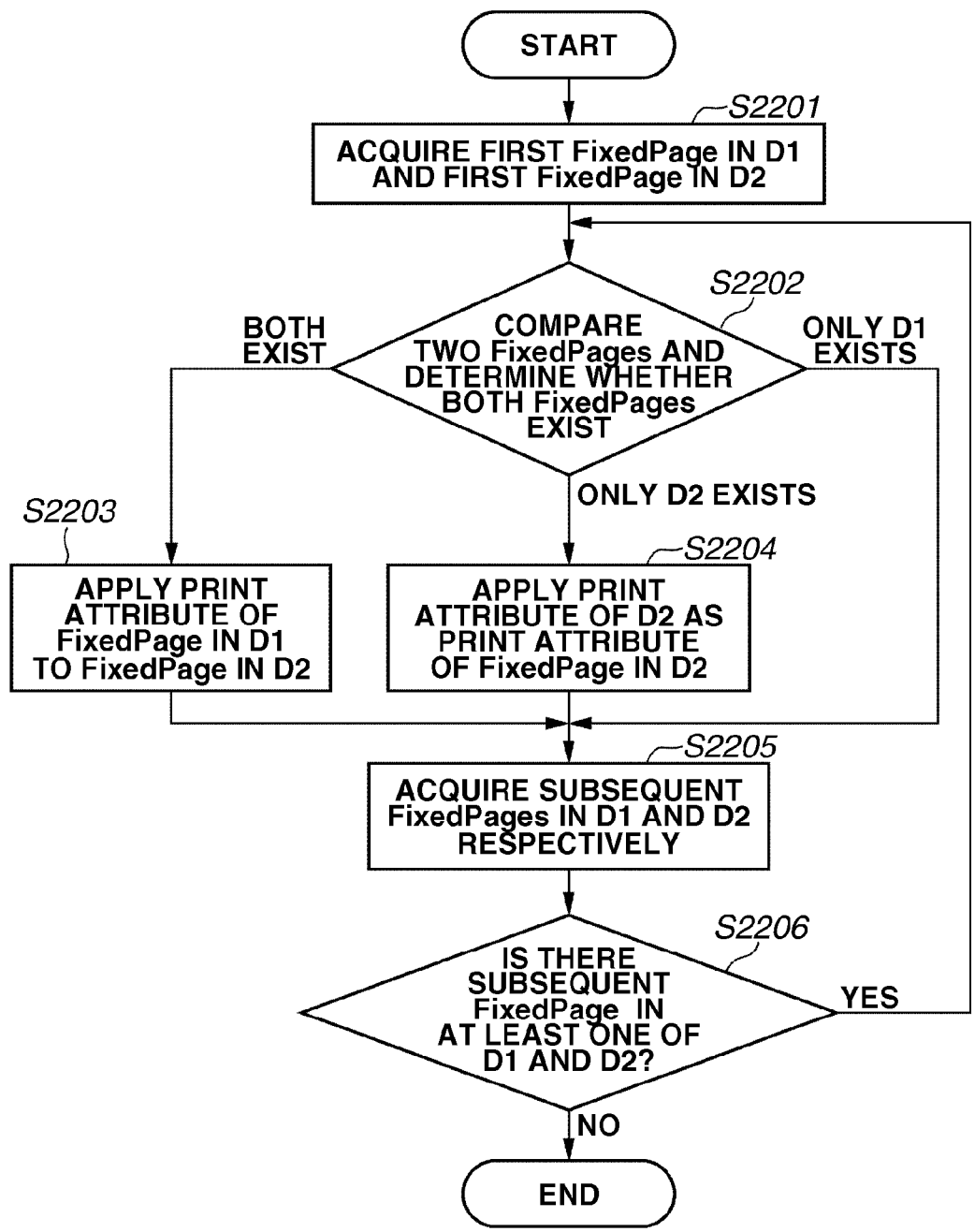
FIG. 23 is a flowchart illustrating in detail the process of step S2108 illustrated in FIG. 22.

FIG. 23 is a flowchart illustrating a detail process performed in step S2108 of the flowchart illustrated in FIG. 22.

FIG. 23 illustrates a process for applying the print attributes of the FixedPages that belong to the lower level of the FixedDocument D1 to the FixedPages that belong to the lower level of the FixedDocument D2. The FixedDocument D1 has the hierarchical structure parts of the favorite XPS document, and the FixedDocument D2 has the hierarchical structure parts of the XPS document to which the favorite print attributes will be applied.

In step S2201, the printer driver 805 acquires the first FixedPage of the FixedDocument D1 and the first FixedPage of the FixedDocument D2 respectively.

In step S2202, the printer driver 805 compares the two FixedPages acquired in step S2201. As a result of comparison, if the printer driver 805 determines that both FixedPages exist (BOTH EXIST in step S2202), the process proceeds to step S2203. If the printer driver 805 determines that the FixedPage exists only in the FixedDocument D2 (ONLY D2 EXISTS in step S2202), the process proceeds to step S2204. Further, if the printer driver 805 determines that the FixedPage exists only in the FixedDocument D1 (ONLY D1 EXISTS in step S2202), the process proceeds to step S2205.

In step S2203, the printer driver 805 applies the print attributes of the FixedPage in the FixedDocument D1 to the FixedPage in the FixedDocument D2.

In step S2204, the printer driver 805 applies the print attributes of the FixedDocument D2 to the FixedPage in the FixedDocument D2.

In step S2205, the printer driver 805 acquires subsequent FixedPages in the FixedDocument D1 and the FixedDocument D2 respectively.

In step S2206, the printer driver 805 confirms the two FixedPages acquired in step S2205 and determines whether the subsequent FixedPage exists in either of the FixedDocument D1 or FixedDocument D2. If the printer driver 805 determines that the subsequent FixedPage exists in either of the FixedDocument D1 or FixedDocument D2 (YES in step S2206), the process returns to step S2202. On the other hand, if the printer driver 805 determines that there is no subsequent page in both of the Fixed Document D1 and Fixed Document D2 (NO in step S2206), the process ends.

Another method for registering the favorite will be described below as a second exemplary embodiment of the present invention.

When the user registers an XPS document as a template using the screen illustrated in FIG. 5, the user presses the file read button 1104, and the printer driver 805 allows the user to select an XPS file in addition to a print attribute file. If the user selects both the print attribute file and the XPS file, the printer driver 805 performs the process illustrated in FIG. 24. Further, the printer driver 805 acquires the hierarchical structure information and the print tickets associated with each of the hierarchical structure parts from the XPS document. The printer driver 805 then stores the acquired hierarchical structure information and print tickets by associating them with the favorite name.

FIG. 24 is a flowchart illustrating an example of a favorite registering process.

In step S2301, the printer driver 805 allows the user to select an XPS document to be registered as the favorite and acquires a path to the XPS document.

In step S2302, the printer driver 805 acquires the hierarchical structure information from the XPS document selected in step S2301.

In step S2303, the printer driver 805 acquires the print ticket from the XPS document selected in step S2301. When the print ticket is acquired, the printer driver 805 acquires information indicating the hierarchical structure part to which the acquired print ticket belongs to.

In step S2304, the printer driver 805 stores the hierarchical structure information acquired in step S2302 and the print ticket acquired in S2303 in a memory by associating them with a registration name of the favorite.

The favorite which is registered by the present exemplary embodiment is different from the favorite applied to the XPS document by the process described with reference to FIG. 22 in the previous exemplary embodiment in that the hierarchical structure information and the print ticket are associated with the registered favorite. As a consequence, it is not necessary to acquire the hierarchical structure information and print tickets from the XPS document. Therefore, step S2102 illustrated in FIG. 22 does not have to be performed. Otherwise, the processes in the present exemplary embodiment are similar to the processes in the previous exemplary embodiment.

According to the present exemplary embodiment, the printer driver 805 stores only minimum information necessary to apply the favorite instead of storing the XPS document itself as in the previous exemplary embodiment. Therefore, a processing speed can be improved and a storage amount can be reduced.

According to a third exemplary embodiment of the present invention, print attributes that are not associated with hierarchical structure information can be applied to a FixedDocumentSequence when a favorite is applied. The favorite can be registered by any of the above-described methods.

When the user selects the favorite to be applied, the printer driver 805 allows the user to select two files that correspond to an entire setting and to an exception setting. The printer driver 805 allows the user to select print attributes of formats other than that of the XPS document as the entire setting. Further, the printer driver 805 allows the user to select only the XPS document as the exception setting. If the user selects the XPS document as the exception setting and does not specify any setting to the entire setting, the printer driver 805 displays the file name of the XPS document specified as the exception setting in an entire settings column on the operation screen. Further, the printer driver 805 uses the print ticket of the FixedDocumentSequence in the XPS document specified in the exception setting as the entire setting.

The printer driver 805 performs a process according to the flowchart illustrated in FIG. 22 for applying the above-described settings. However, the process of step S2104 is different from the previous exemplary embodiments. In step S2104 illustrated in FIG. 22, the printer driver 805 acquires the print ticket (print attributes) of the FixedDocumentSequence in the favorite XPS document. The printer driver 805 then applies the acquired print ticket to the FixedDocumentSequence of the XPS document to which the favorite be applied.

On the other hand, according to the present exemplary embodiment, if the file specified to the entire setting is different from the file specified to the exception setting, the printer driver 805 applies the print attributes specified to the entire setting to the FixedDocumentSequence of the XPS document to which the favorite is applied. Further, the printer driver 805 applies the print ticket of the FixedDocumentSequence in the XPS document specified to the exception setting to the FixedDocumentSequence in the XPS document to which the favorite be applied.

According to the present exemplary embodiment, the print attributes that are not associated with the hierarchical structure information can be applied to the FixedDocumentSequence together with the existing favorites. As a result, resources of the favorites can be efficiently used.

The present invention can be achieved by providing a computer-readable storage medium (or a computer-readable recording medium) which stores software (program code) for implementing functions of the above-described exemplary embodiments to a system or an apparatus. The program code stored in the computer-readable storage medium can be read and executed by a computer (central processing unit (CPU) or micro-processing unit (MPU)) of the system or the apparatus. In this case, the program code read from the computer-readable storage medium realizes the functions of the exemplary embodiments of the present invention, and the computer-readable storage medium which stores the program code constitutes the present invention.

Furthermore, the functions of the above-described exemplary embodiments can be realized not only by executing the program code read by the CPU but also by performing a part or the whole of processes by an operating system (OS) or the like working on a computer according to instructions of the program code.

Furthermore, the program code read from the computer-readable storage medium can be stored in a memory equipped in a function expansion card inserted in or a function expansion unit connected to the computer of the system or the apparatus, and a CPU in the function expansion card or the function expansion unit can execute a part or the whole of processes according to the instructions of the program code to realize the functions of the above-described exemplary embodiments.

In a case where the present invention is applied to the computer-readable storage medium, the program code that corresponds to the flowcharts illustrated in the figures of the above-described exemplary embodiments are stored in the computer-readable storage medium.

According to the above-describe exemplary embodiments, print attributes including exception settings can be registered from an XPS document as a print template. Therefore, the print template can be applied to other XPS documents. As a result, print attributes of an XPS document in which complex print attributes have been set can be re-used, so that setting print attributes can be simplified. More specifically, a user can reuse print attributes of a document which has a hierarchical structure, so that the user can easily set the print attributes to a document which has a hierarchical structure.

According to the present invention, print attributes of a document having a hierarchical structure can be reused, so that a user can easily set print attributes to a document which has a hierarchical structure.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-048533 filed Feb. 28, 2008, which is hereby incorporated by reference herein in its entirety.

What is claimed is:

1. An information processing apparatus comprising:
a storing unit configured to store, in a storage device, print setting information including a hierarchical structure of a document and a print attribute associated with a hierarchical level of the document; and
a setting unit configured to, when the print attribute in the print setting information stored in the storage device is applied to a selected document, compare a hierarchical structure of the selected document and the hierarchical structure of the print setting information and to set a print attribute to an appropriate hierarchical level of the selected document based on a comparison result and the print attribute of the print setting information,
wherein when a number of hierarchical structures of the selected document is greater than a number of hierarchical structures of the print setting information as the comparison result, the setting unit sets a same print attribute that is set to the hierarchical structure on an upper structure level of the selected document, to an excess of the number of hierarchical structures.

2. The information processing apparatus according to claim 1, wherein the storing unit stores, in the storage device, the document associated with the hierarchical structure of the document and the print attribute associated with the hierarchical level of the document as the print setting information.

3. The information processing apparatus according to claim 1, wherein the hierarchical level includes a job level, a document level and a page level.

4. The information processing apparatus according to claim 1,
wherein in a case where the number of the hierarchical structures of the selected document is less than the number of the hierarchical structures of the print setting information being associated with a name of the selected document, the setting unit does not set a print attribute associated with a hierarchical structure of the document corresponding to the print setting information.

5. A method for processing information in an information processing apparatus, the method comprising:
storing, in a storage device, print setting information including a hierarchical structure of a document and a print attribute associated with a hierarchical level of the document; and
when the print attribute in the print setting information stored in the storage device is applied to a selected document, comparing a hierarchical structure of the selected document and the hierarchical structure of the print setting information and setting a print attribute to an appropriate hierarchical level of the selected document based on a comparison result and the print attribute of the print setting information,
wherein when a number of hierarchical structures of the selected document is greater than a number of hierarchical structures of the print setting information as the comparison result, setting a same print attribute that is set to the hierarchical structure on an upper hierarchical level of the selected document, to an excess of the number of hierarchical structures.

6. The method according to claim 5, further comprising storing, in the storage device, the document associated with the hierarchical structure of the document and the print attribute associated with the hierarchical level of the document as the print setting information.

7. The method according to claim 5, wherein the hierarchical level includes a job level, a document level and a page level.

8. The method according to claim 5,
wherein in a case where the number of the hierarchical structures of the selected document is less than the number of the hierarchical structures of the print setting information being associated with a name of the selected document, the setting step does not set a print attribute associated with a hierarchical structure of the document corresponding to the print setting information.

9. A computer-readable storage medium which stores a program for causing a computer to execute a method comprising:
- storing, in a storage device, print setting information including a hierarchical structure of a document and a print attribute associated with a hierarchical level of the document; and
- when the print attribute in the print setting information stored in the storage device is applied to a selected document, comparing a hierarchical structure of the selected document and the hierarchical structure of the print setting information and setting a print attribute to an appropriate hierarchical level of the selected document based on a comparison result and the print attribute of the print setting information,
- wherein when a number of hierarchical structures of the selected document is greater than a number of hierarchical structures of the print setting information as the comparison result, setting a same print attribute that is set to the hierarchical structure on an upper hierarchical level of the selected document, to an excess of the number of hierarchical structures.

10. The computer-readable storage medium according to claim 9,
- wherein the method further comprises storing, in the storage device, the document associated with the hierarchical structure of the document and the print attribute associated with the hierarchical level of the document as the print setting information.

11. The computer-readable storage medium according to claim 9, wherein the hierarchical level includes a job level, a document level and a page level.

12. The computer-readable storage medium according to claim 9,
- wherein in a case where the number of the hierarchical structures of the selected document is less than the number of the hierarchical structures of the print setting information being associated with a name of the selected document, the setting step does not set a print attribute associated with a hierarchical structure of the document corresponding to the print setting information.

* * * * *